(12) United States Patent
Graffy et al.

(10) Patent No.: US 11,119,818 B2
(45) Date of Patent: *Sep. 14, 2021

(54) CONTEXTUAL AWARENESS ASSOCIATED WITH RESOURCES

(71) Applicant: GE Aviation Systems LLC, Grand Rapids, MI (US)

(72) Inventors: Melanie Sue-Hanson Graffy, Byron Center, MI (US); Colin Holmwood, Ada, MI (US); Jon Marc Diekema, Jenison, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,496

(22) Filed: Dec. 31, 2019

(65) Prior Publication Data

US 2020/0133717 A1  Apr. 30, 2020

Related U.S. Application Data

(63) Continuation of application No. 15/603,408, filed on May 23, 2017, now Pat. No. 10,552,206.

(51) Int. Cl.
*G06F 9/48* (2006.01)
*G06F 21/62* (2013.01)
(Continued)

(52) U.S. Cl.
CPC ......... *G06F 9/4843* (2013.01); *G06F 9/445* (2013.01); *G06F 21/62* (2013.01); *H04L 63/102* (2013.01); *H04L 67/34* (2013.01); *H04L 63/08* (2013.01)

(58) Field of Classification Search
CPC ......... G06F 9/4843; G06F 21/62; G06F 9/445
See application file for complete search history.

(56) References Cited

U.S. PATENT DOCUMENTS 6,281,810 B1  8/2001 Factor
6,507,288 B2  1/2003 Block
(Continued)

FOREIGN PATENT DOCUMENTS

EP  2500693  9/2012
WO  2011147887  12/2011

OTHER PUBLICATIONS

First Examination report received for Canadian Application Serial No. 3004550 dated Mar. 1, 2019, 3 pages.
(Continued)

*Primary Examiner* — Dong U Kim
(74) *Attorney, Agent, or Firm* — Fitch, Even, Tabin & Flannery, LLP

(57) ABSTRACT

Contextual awareness associated with resources can be employed to facilitate controlling access to resources of a system, including function blocks. A resource manager component (RMC) can pre-load a defined number of respective versions of configuration parameter data associated with respective applications in each resource. With regard to each application, the RMC can associate a context value, unique for each application, with the respective versions of configuration parameter data associated with that application. When a current application is being changed to a next application, the RMC can write the context value associated with the next application to a context select component (CSC). Each resource can read the context value in the CSC, identify and retrieve the version of configuration parameter data associated with the next application based on the context value, and configure the function block based on the version of configuration parameter data.

20 Claims, 10 Drawing Sheets

(51) Int. Cl.
*H04L 29/06* (2006.01)
*G06F 9/445* (2018.01)
*H04L 29/08* (2006.01)

(56) References Cited

U.S. PATENT DOCUMENTS

| | | | |
|---|---|---|---|
| 7,012,553 | B2 | 3/2006 | Hedrick |
| 8,359,542 | B2 | 1/2013 | Dingeman et al. |
| 8,412,675 | B2 | 4/2013 | Alvarado et al. |
| 8,497,816 | B2 | 7/2013 | Coloma et al. |
| 8,725,320 | B1 | 5/2014 | Pschierer |
| 8,731,901 | B2 | 5/2014 | Srihari et al. |
| 8,779,944 | B2 | 7/2014 | Weinmann et al. |
| 8,813,060 | B2 | 8/2014 | Tewari et al. |
| 8,831,658 | B2 | 9/2014 | Meylan et al. |
| 8,878,941 | B2 | 11/2014 | Anway et al. |
| 9,202,098 | B2 | 12/2015 | Lewis et al. |
| 9,215,244 | B2 | 12/2015 | Kyyagari et al. |
| 9,271,238 | B2 | 2/2016 | Ismail et al. |
| 9,546,002 | B1 | 1/2017 | Azcuenaga et al. |
| 10,552,206 | B2 | 2/2020 | Graffy |
| 2005/0022157 | A1 | 1/2005 | Brendle et al. |
| 2005/0080942 | A1 | 4/2005 | Ogilvie et al. |
| 2005/0086462 | A1 | 4/2005 | Vorbach |
| 2007/0033382 | A1 | 2/2007 | Mandalia et al. |
| 2007/0050603 | A1 | 3/2007 | Vorbach et al. |
| 2007/0204137 | A1 | 8/2007 | Tran |
| 2007/0236366 | A1 | 10/2007 | Gur et al. |
| 2008/0282345 | A1 | 11/2008 | Beals |
| 2012/0131309 | A1 | 5/2012 | Johnson et al. |
| 2013/0046966 | A1 | 2/2013 | Chu et al. |
| 2014/0204815 | A1 | 7/2014 | Ismail et al. |
| 2014/0344420 | A1 | 11/2014 | Rjeili et al. |
| 2015/0015422 | A1 | 1/2015 | Michaels |
| 2015/0106596 | A1* | 4/2015 | Vorbach ............ G06F 15/7814 712/221 |
| 2016/0029204 | A1 | 1/2016 | Lalwaney |
| 2016/0048470 | A1 | 2/2016 | Zhang et al. |
| 2016/0170808 | A1 | 6/2016 | Cannon et al. |
| 2017/0097910 | A1 | 4/2017 | Kumar et al. |

OTHER PUBLICATIONS

European search report received for European Application Serial No. 18172320.6 dated Oct. 23, 2018, 12 pages.
Communication pursuant to Rule 69 EPC received for European Application Serial No. 18172320.6 dated Dec. 3, 2018, 2 pages.
Non-Final Office Action received for U.S. Appl. No. 15/603,408 dated May 28, 2019, 40 pages.
Second Examination report received for Canadian Application Serial No. 3004550 dated Jan. 29, 2020, 4 pages.
U.S. Appl. No. 15/603,408; Notice of Allowance dated Sep. 20, 2019; p. 5.

* cited by examiner

CONTEXTUAL AWARENESS ASSOCIATED WITH RESOURCES

CROSS-REFERENCE TO RELATED APPLICATION

This application is a continuation of, and claims priority to, U.S. patent application Ser. No. 15/603,408, filed May 23, 2017, and entitled "CONTEXTUAL AWARENESS ASSOCIATED WITH RESOURCES," the entirety of which is hereby incorporated herein by reference.

TECHNICAL FIELD

This disclosure relates generally to controlling access to resources, e.g., employing contextual awareness associated with resources to facilitate controlling access to the resources.

BACKGROUND

A system can employ various applications and resources (e.g., hardware resources and/or software resources) to perform various operations and process data. Different applications can be associated with different parameters in connection with accessing and utilizing resources. When one application is swapped for another application, the parameters for various resources have to be changed. The longer it takes to swap applications and change parameters, the more system performance can be negatively impacted.

The above-described description is merely intended to provide a contextual overview relating to systems employing applications and resources, and is not intended to be exhaustive.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with a non-limiting, example implementation, a method can comprise storing, by a system comprising a processor, respective sets of configuration data in respective resources of a system-on-chip device, wherein the respective sets of configuration data are associated with respective applications and the respective resources. The method also can comprise controlling, by the system, configuration of and access to the respective resources based at least in part on the respective sets of configuration data associated with respective contexts relating to the respective applications.

In accordance with another non-limiting, example implementation, a system can include a set of resources that perform respective functions, wherein respective sets of configuration parameter data are stored in respective resources of the set of resources, wherein the respective sets of configuration parameter data are associated with respective applications related to respective contexts. The system also can comprise a memory that stores computer-executable components, and a processor that executes computer-executable components stored in the memory. The computer executable-components can comprise a resource management component that facilitates controlling respective configuration of and access to the respective resources based at least in part on the respective sets of configuration parameter data, in accordance with respective context values associated with the respective contexts.

In accordance with still another non-limiting, example implementation, a machine-readable medium can comprise executable instructions that, when executed by a processor, facilitate performance of operations. The operations can comprise storing respective items of configuration parameter information in respective resources of a system-on-chip device, wherein the respective items of configuration parameter information are associated with respective applications and the respective resources, and wherein the respective applications are associated with respective context values. The operations also can comprise managing configuration of and access to the respective resources based at least in part on the respective items of configuration parameter information associated with the respective context values, wherein different context values of the respective context values are employed at different periods of time to facilitate transitioning between different applications of the respective applications over the different periods of time.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
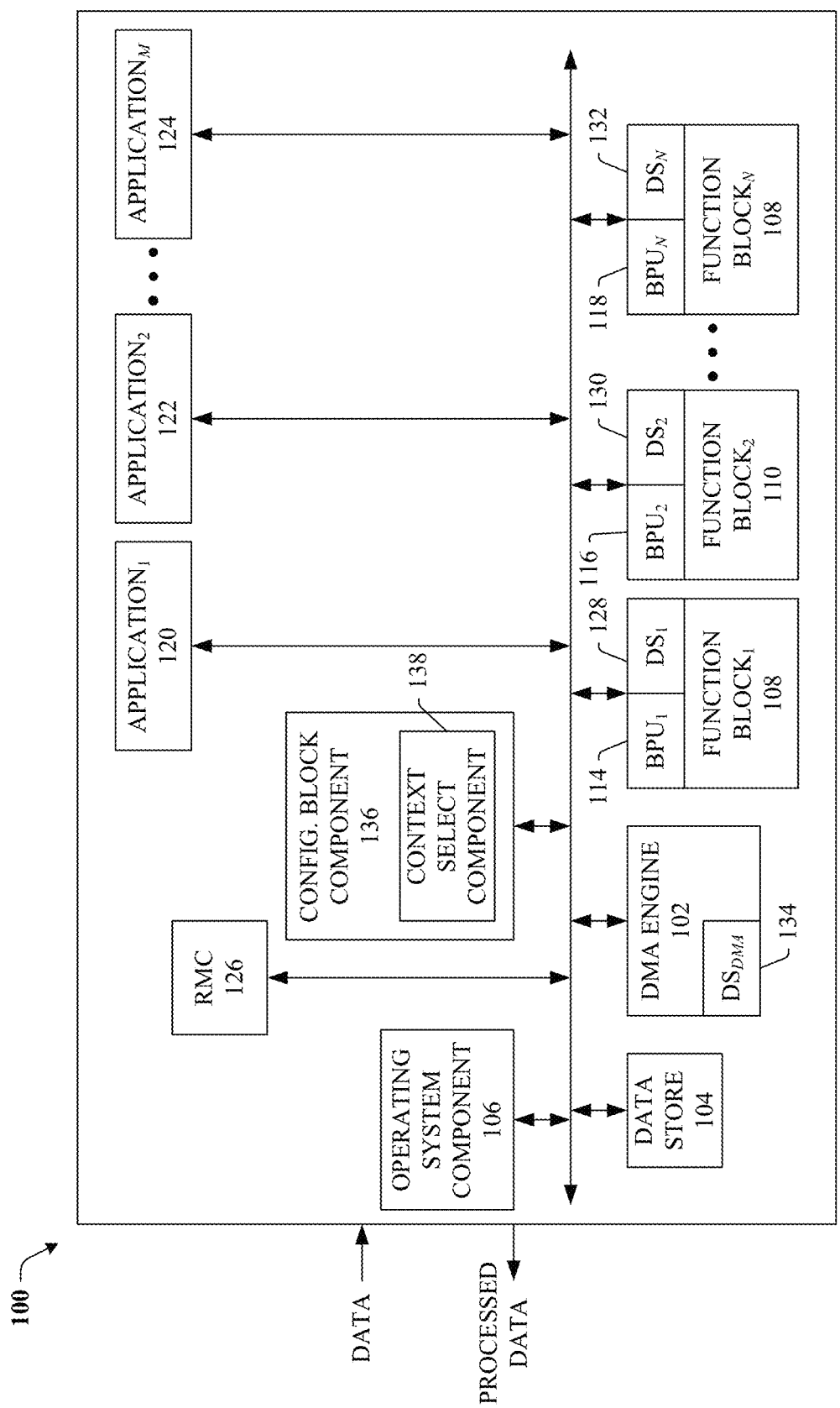
FIG. 1 illustrates a block diagram of an example system that can employ a context value to facilitate transitioning between different contexts and controlling access to resources, in accordance with one or more embodiments of the disclosed subject matter.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure might be practiced without these specific details, or with other methods, components, materials, etc. In other instances, well-known structures and devices are shown in block diagram form to facilitate describing one or more aspects.

A system, such as a system-on-chip, for example, can employ various applications and resources (e.g., hardware resources and/or software resources) to perform various operations and process data. Different applications can be associated with different parameters in connection with accessing and utilizing resources. When one application is swapped for another application, the parameters for various resources typically have to be changed. The longer it takes to swap applications and change parameters, the more system performance can be negatively impacted. For instance, processing time of the system can be reduced due to the time spent on swapping applications and changing parameters. Another problem that can occur is that an application may interfere with another application.

One way to swap one application for another application is to reload the resources (e.g., hardware resources) when each application is swapped into the system. However, such an approach can be undesirably time consuming and can reduce processing time and system performance of the system. Another approach for swapping one application for another application is to implement the same hardware resources, but have the software update each configuration table as applications are swapped in and out according to an execution schedule. However, this other approach also can be undesirably time consuming and can reduce processing time and system performance of the system.

The disclosed subject matter can employ techniques for contextual awareness associated with resources (e.g., hardware resources), including resources of function blocks, of a system (e.g., a system-on-chip or other type of system) to facilitate controlling access to the resources. A resource manager component can pre-load and store a defined number of respective versions of configuration parameter data associated with respective applications in each of the resources of the system. With regard to each application, the resource manager component can associate a context value with the respective versions of configuration parameter data associated with that application, wherein each context value can be unique with respect to each application.

When a current application is being changed to a next application, the resource manager component can write the particular context value associated with the next application to a context select component. Each of the resources (e.g., function blocks and associated block protection units) can read the context value in the context select component, identify and retrieve the respective version of configuration parameter data associated with the next application based at least in part on the context value, and configure the resource based at least in part on the version of configuration parameter data associated with that application and the resource.

These and other aspects of the disclosed subject matter are described with regard to the figures.

FIG. 1 illustrates a block diagram of an example system 100 that can employ a context value to facilitate transitioning between different contexts and controlling access to resources, in accordance with one or more embodiments of the disclosed subject matter. Generally, systems (e.g., system 100) detailed herein can comprise one or more processors and one or more memories (e.g., one or more data stores) that can store executable instructions. The instructions, when executed by a processor of the one or more processor, can facilitate performance of operations detailed herein. Examples of the one or more memories and one or more processors can be found with reference to FIG. 9. It is to be appreciated that the computer 912 can represent a suitable computing device that can be used in connection with implementing one or more of the systems or components shown and described in connection with FIG. 1 and other figures disclosed herein and/or the systems or components disclosed herein can comprise the computer 912. Moreover, systems detailed herein or components thereof can be employed to use hardware and/or software to solve problems that are highly technical in nature (e.g., related to vehicles (e.g., aircraft, ship, train, automobile, . . . ), power plants (e.g., nuclear or other types of power plants), medical systems, etc.), that are not abstract and that cannot be performed as a set of mental acts by a human. For example, in some embodiments, certain determinations performed by components detailed herein can be based on very large data sets that mental acts by a human cannot solve sufficiently quickly to be as useful as otherwise. Furthermore, in some embodiments, certain solutions or determinations of components detailed herein can provide significant improvements to certain technological fields or domains such as technological domains relating to vehicles, power plants, medical systems, etc.

In some embodiments, the system 100 can be or can comprise a system-on-chip (SoC), which can be a customizable or configurable SoC (cSoC), which can comprise various hardware resources (and software resources) that can be customized and re-configured, wherein the cSoC can be formed on a single die or chip. The system 100 can relate to and be employed to facilitate operation of, for example, vehicles (e.g., aircraft, ship, train, automobile, . . . ), power plants (e.g., nuclear or other types of power plants), medical systems, or other types of systems or devices.

The system 100 can comprise a direct memory access (DMA) engine 102 that can perform processing operations and data transfers to or from a data store 104 (e.g., one or more memory components), or other components or devices, of or associated with the system 100. In some embodiments, the DMA engine 102 can be an independent DMA (IDMA) engine.

The system 100 can receive data from one or more devices, components, or other systems. Using the DMA engine 102 and other resources of the system 100, the system 100 can process data, as more fully disclosed herein, and can provide (e.g., transmit) the processed data to one or more devices, components, or other systems, which can be the same as or different from the device(s), component(s), or other system(s) that provided the data used to generate the processed data, and/or the system 100 can store the processed data in the data store 104 or another data store(s) of the system 100.

The system 100 also can include an operating system component 106 that can employ one or more operating systems that can facilitate managing hardware and/or software resources of the system 100 and/or peripheral (e.g., peripheral hardware and/or software) resources associated with the system 100. The operating system component 106 can be associated with (e.g., connected to) the DMA engine 102, the data store 104, and/or other components of the system 100.

The system 100 can comprise a set of function blocks, including, for example, function block$_1$ 108, function block$_2$ 110, up through function block$_N$ 112, that can perform various respective functions on (e.g., to process) data or with regard to data, wherein N can be virtually any desired number. The respective function blocks (e.g., 108, 110, 112, ... ) can perform respective functions comprising or relating to, for example, performing calculations on data, determining measurements based at least in part on certain data, determining (e.g., calculating) or identifying peak, mean, and/or average values of certain data, encrypting and/or decrypting data, encoding and/or decoding data, compressing and/or decompressing data, determining or identifying a location, travel route (e.g., primary travel route and/or alternate travel route(s)), time (e.g., estimated time) to destination, and/or overall travel time associated with a vehicle (e.g., aircraft, ship, train, automobile, ... ), process video content, process audio content, object, character, and/or voice or speech recognition in content (e.g., video and/or audio content), transmitting data, receiving data, etc. As some examples, a cryptographic function block can be employed to encrypt and/or decrypt data using desired encryption and/or decryption techniques; a coder function block can encode and/or decode data using desired encoding and/or decoding techniques; a navigation function block that can facilitate determining or identifying the location, travel route(s), time (e.g., estimated time) to destination, and/or overall travel time associated with a vehicle; a transmitter function block that can facilitate transmitting data using desired data transmission techniques and protocols; a receiver function block that can facilitate receiving data using desired data receiving techniques and protocols; etc. There also can be other or alternate function blocks that can perform other functions and tasks. The respective function blocks (e.g., 108, 110, 112, ... ) can comprise respective hardware resources and/or software resources that can facilitate performance of the respective functions.

In some embodiments, all of the function blocks (e.g., 108, 110, 112, ... ) can be located in a secure partition(s), wherein access to the function blocks can be restricted to authorized entities (e.g., users, applications, components, ... ) that have valid authentication credentials, and wherein the secure partition(s) can deny access to unauthorized entities or entities that have otherwise not presented valid authentication credentials. With regard to function blocks in the secure partition(s), an authorized entity can be authorized to access all or only a portion of the function blocks. In other embodiments, a subset of the function blocks can be located in the secure partition(s) and another subset of the function blocks can be located in a non-secure (e.g., open) partition. Additionally or alternatively, respective resources (e.g., function blocks) each can have their own respective partitions (e.g., as protected by respective block protection units).

The set of function blocks (e.g., 108, 110, 112, ... ) can comprise or be associated with a set of block protection units (BPUs), including, for example, BPU$_1$ 114, BPU$_2$ 116, up through BPU$_N$ 118, that can be associated with or part of the set of function blocks and can facilitate protecting and separating (e.g., managing or controlling access to) the set of function blocks from applications, the DMA engine 102, and/or other entities or components of or associated with the system 100. It is to be appreciated and understood that, while the respective BPUs are shown in FIG. 1 as being associated with (e.g., connected to) the respective function blocks, the disclosed subject matter is not so limited, as, in some embodiments, all or a portion of the respective BPUs can be contained within respective function blocks. It also is to be appreciated and understood that, while the number of BPUs shown in FIG. 1 can be the same as the number of function blocks, the disclosed subject matter is not so limited, as the number of BPUs can be the same as or different from the number of function blocks. For example, a BPU can be associated with and facilitate protecting (e.g., controlling access to) more than one function block. The BPUs (e.g., 114, 116, 118, ... ) can be associated with the DMA engine 102, data store 104, operating system component 106, and/or other components of the system 100.

The system 100 also can comprise a set of applications, including, for example, application$_1$ 120, application$_2$ 122, up through application$_M$ 124, that can be associated with the DMA engine 102, operating system component 106, and/or the BPUs and/or function blocks (e.g., when granted access to such function block(s)), wherein M can be virtually any desired number that can be the same as or different from N. Respective applications of the set of applications (e.g., 120, 122, 124, ... ) can comprise respective features, which can be based at least in part on respective programs (e.g., application or software programs), to perform various respective functions, tasks, or activities. The respective applications can process data, perform calculations, render determinations, encrypt or decrypt data, compress or decompress data, etc. In some embodiments, the respective applications (e.g., 120, 122, 124, ... ) can relate to and be employed to facilitate operation of vehicles, power plants, medical systems, and/or other types of devices or systems.

At various times, one or more applications (e.g., 120, 122, 124, ... ) can desired to access one or more function blocks (e.g., 108, 110, 112, ... ) to have the one or more function blocks perform respective operations, functions, or tasks on data, which can be received from, for example, the DMA engine 102, application(s), data store 104, another function block, another component, and/or another data source in or associated with the system 100. Different applications can have different configurations, features, functions, components, etc., from each other. Further, respective applications (e.g., 120, 122, 124, ... ) can have different levels of access or access rights to access respective function blocks (e.g., 108, 110, 112, ... ). As a result, when a particular application desires access to one or more function blocks, it can be desirable to reconfigure the one or more function blocks, based at least in part on respective configuration parameters, to enable the one or more function blocks to operate desirably (e.g., suitably, properly, favorably, optimally) in connection with the particular application.

During various times (e.g., time or computing cycles), applications frequently can be swapped in and out with regard to access to the DMA engine 102 and function blocks (e.g., 108, 110, 112, . . . ). For instance, at a first time, the system 100 can be operating in a first context, wherein a first application (e.g., application$_1$ 120) can be accessing the DMA engine 102 and/or one or more function blocks (e.g., 108, 110, and/or 112, . . . ) to perform various operations, functions, or tasks; at a second time, the system 100 can be operating in a second context, wherein the first application can be swapped out for a second application (e.g., application$_2$ 122), wherein the second application can be accessing the DMA engine 102 and/or one or more function blocks (e.g., 108, 110, and/or 112, . . . ) to perform various operations, functions, or tasks; and so on.

The respective applications can access the resources of the system 100 to which the respective applications are authorized to have access in accordance with a schedule (e.g., real time operating system (RTOS) schedule). The scheduling of access to the resources of the system 100 for the applications can be based at least in part on time, giving respective applications certain amounts of time to access resources of the system 100 to which access has been granted, based at least in part on relative priorities of applications with respect to each other, based at least in part on events (e.g., external events) that occur which can result in a particular application(s) being granted access and time to resources over another application(s), in response to the event, and/or based at least in part on other considerations.

To facilitate desirable operation of the system 100 with respect to swapping applications in and out, the system 100 can implement contextual awareness, including software contextual awareness within the DMA engine 102, function blocks (e.g., 108, 110, and/or 112, . . . ), BPUs (e.g., 114, 116, 118, . . . ), and/or other components of the system 100 to facilitate enabling the DMA engine 102, function blocks (e.g., 108, 110, and/or 112, . . . ), BPUs (e.g., 114, 116, 118, . . . ), and/or other components of the system 100 to efficiently and expeditiously adapt (e.g., reconfigure) to desirably operate with respect to the application currently accessing the DMA engine 102, function blocks (e.g., 108, 110, and/or 112, . . . ), BPUs (e.g., 114, 116, 118, . . . ), and/or other components of the system 100 at a given time. In some embodiments, the system 100 can comprise a resource management component 126 (RMC) that can be employed to facilitate controlling access to and use of resources, controlling the context of the system (e.g., controlling the swapping in and out of applications associated with respective contexts), and/or other functions or operations of the system 100.

In accordance with one or more embodiments, the resource management component 126 can pre-load or facilitate pre-loading respective configuration parameter data associated with respective applications (e.g., 120, 122, 124, . . . ) into respective function blocks, BPUs, the DMA engine 102, and/or other components of the system 100 to facilitate reconfiguring the respective function blocks, BPUs, DMA engine 102, and/or other components of the system 100 during different contexts at different times as applications are swapped in and out (e.g., as different applications access the function blocks and DMA engine 102 at different times). For example, the resource management component 126 can pre-load or facilitate pre-loading a defined number of versions of respective configuration parameter data into the respective function blocks, BPUs, the DMA engine 102, and/or other components of the system 100, wherein the defined number can be, for example, 2, 4, 8, 16, 32, 64, 128, or another desired number. For instance, a distributed configuration table comprising respective configuration parameter data can be generated (e.g., by the resource management component 126 or another component), wherein the resource management component 126 can distribute and pre-load respective portions of the distributed configuration table, comprising respective portions of the configuration parameter data, to the respective resources of the system 100 (e.g., respective function blocks and BPUs, DMA engine 102, . . . ). The resource management component 126 can pre-load or facilitate pre-loading the respective configuration parameter data into the respective resources at start-up or re-boot of the system 100 or at another desired time. The resource management component 126 also can update configuration parameter data in or associated with resources with respect to an application(s) to replace or modify configuration parameter data, for example, when changes are made to configuration parameters due to changes in the application (e.g., application updates) or other enhancements.

Configuration parameters can relate to, for example, whether or not an application is granted access to a particular function block or other resource, an access port(s) (e.g., input port(s), output port(s)) to use to input or receive data to or from a function block or other resource, a data format to use when processing or formatting data, a protocol to use when processing data, a type of cryptographic technique or algorithm to use when encrypting or decrypting data, a type of data compression technique or algorithm to use when compressing or decompressing data, a type of security technique or algorithm to use to secure data, and/or other characteristics or features.

In some embodiments, the respective function blocks, BPUs, DMA engine 102, and/or other components of the system 100 can comprise respective data stores in which the respective configuration parameter data and respectively associated context values can be stored. For instance, the respective function blocks (e.g., 108, 110, and/or 112, . . . ) and/or BPUs (e.g., 114, 116, 118, . . . ) can comprise or be associated with respective data stores (DSs), including data store$_1$ 128, data store$_2$ 130, up through data store$_N$ 132, the DMA engine 102 can comprise or be associated with data store$_{DMA}$ 134, and/or other components of the system 100 can comprise or be associated with respective data stores (not shown), in which the respective configuration parameter data and associated respective context values can be stored.

Figure 2:
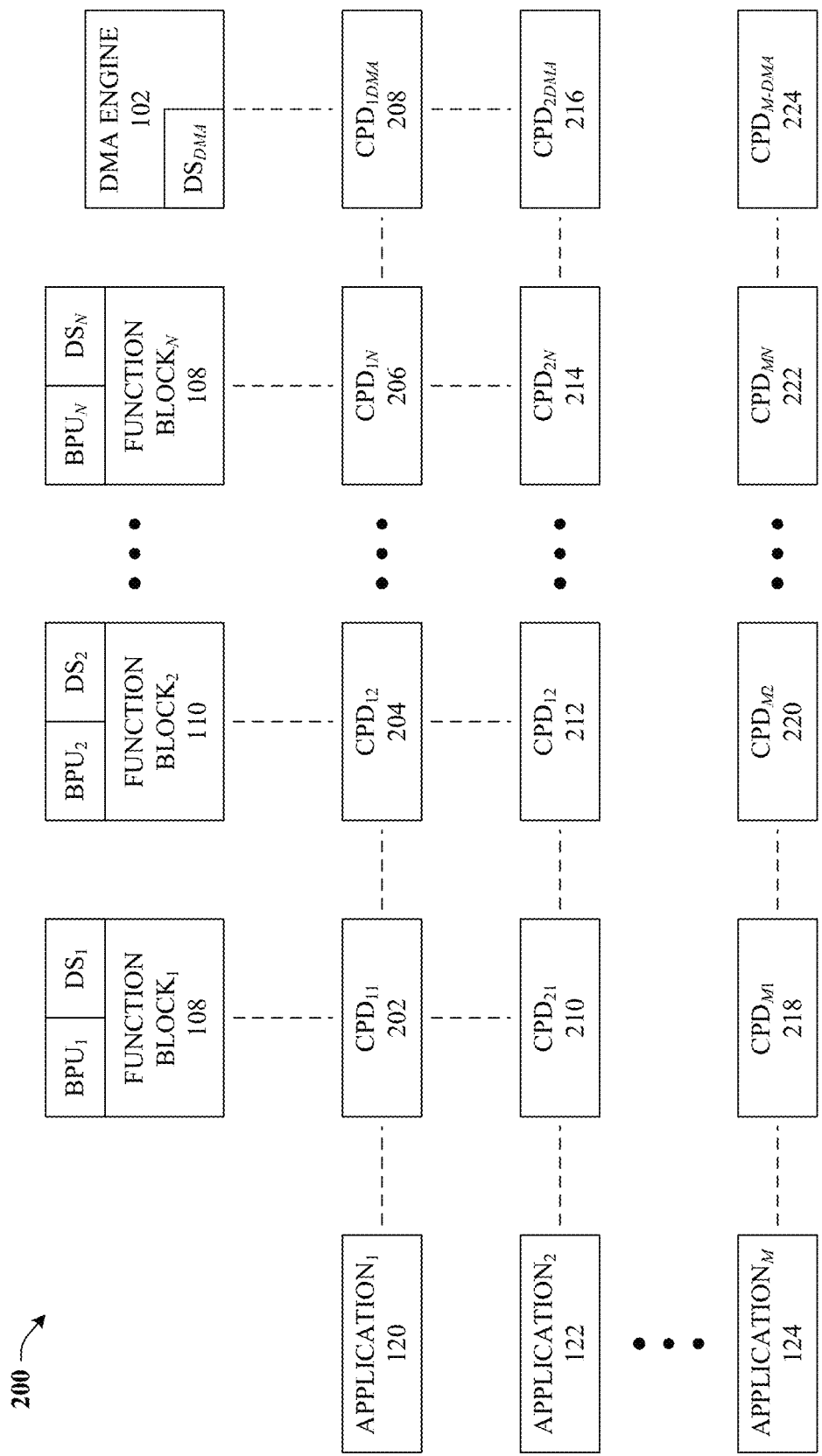
FIG. 2 presents a block diagram of an example grid that can illustrate respective configuration parameter data associated with respective function blocks (and/or associated block protection units) and a DMA engine with regard to respective applications, in accordance with various embodiments and implementations of the disclosed subject matter.

Referring to FIG. 2 (along with FIG. 1), FIG. 2 presents a block diagram of an example grid 200 that can illustrate respective configuration parameter data (CPD) associated with respective function blocks (and/or associated BPUs) and the DMA engine with regard to respective applications, in accordance with various embodiments and implementations of the disclosed subject matter. As illustrated in the grid 200, with regard to the application$_1$ 120, CPD$_{11}$ 202 can be associated with function block$_1$ 108 and/or BPU$_1$ 114 (and stored in DS$_1$ 128), CPD$_{12}$ 204 can be associated with function block$_2$ 110 and/or BPU$_2$ 116 (and stored in DS$_2$ 130), CPD$_{1N}$ 206 can be associated with function block$_N$ 112 and/or BPU$_N$ 118 (and stored in DS$_N$ 132), and CPD$_{1DMA}$ 208 can be associated with the DMA engine 102 (and stored in DS$_{1DMA}$ 134). As also illustrated in the grid 200, with regard to the application$_2$ 122, CPD$_{21}$ 210 can be associated with function block$_1$ 108 and/or BPU$_1$ 114 (and stored in DS$_1$ 128), CPD$_{22}$ 212 can be associated with function block$_2$ 110 and/or BPU$_2$ 116 (and stored in DS$_2$ 130), CPD$_{2N}$ 214 can be associated with function block$_N$ 112 and/or BPU$_N$ 118 (and stored in DS$_N$ 132), and CPD$_{2DMA}$ 216 can be associated with the DMA engine 102 (and stored in DS$_{1DMA}$ 134). As further illustrated in the grid 200, with regard to the application$_M$ 124, CPD$_{M1}$ 218 can be associated with function block$_1$ 108 and/or BPU$_1$ 114 (and stored in DS$_1$ 128), CPD$_{M2}$ 220 can be associated with function block$_2$ 110 and/or BPU$_2$ 116 (and stored in DS$_2$ 130), CPD$_{MN}$ 222 can be associated with function block$_N$ 112 and/or BPU$_N$ 118 (and stored in DS$_N$ 132), and CPD$_{M\text{-}DMA}$ 216 can be associated with the DMA engine 102 (and stored in DS$_{1DMA}$ 134).

It is to be appreciated and understood that, in other embodiments, a common or central configuration table can be employed, wherein the common or central configuration table can be stored in another storage location, such as, for example, the data store 104. For instance, the central or common configuration table, comprising the respective configuration parameter data associated with the respective function blocks, corresponding BPUs, the DMA engine 102, and/or other components of the system 100, with respect to the respective applications, can be stored in the data store 104, wherein during a change in context (e.g., a change in applications), the respective resources (e.g., function blocks, BPUs, DMA engine, . . . ) can access the data store 104 and retrieve the appropriate configuration parameter data from the data store 104 for use in connection with the application being swapped in to access all or a portion of the resources.

The system 100 also can comprise a configuration block component 136 (CONFIG. BLOCK COMPONENT) that can facilitate configuring the respective resources of the system 100. The configuration block component 136 can comprise a context select component 138 that can be employed to receive and store a context value (e.g., a common value or common context value) associated with a context of the system 100. In some embodiments, the context select component 138 can be or comprise a register (e.g., context select register) in which the context value can be stored.

A context value can be, comprise, or represent a number (e.g., a binary number, an integer number, a real number), or other alphanumeric character or character string. Respective contexts and associated context values can be associated with respective applications (e.g., 120, 122, 124, . . . ). As an example, a context value of 1 (e.g., in binary form or other form) can be associated with application$_1$ 120, a context value of 2 can be associated with application$_2$ 122, a context value of 3 can be associated with application$_3$, and a context value of M (with M being a desired number) can be associated with application$_M$.

The respective resources (e.g., function blocks and associated BPUs, DMA engine, . . . ) can monitor the context select component 138. In response to detecting a change in the context value stored in the context select component 138, in connection with a change in context of the system, e.g., in connection with a change from one application to another application with regard to use of resources of the system 100, the respective resources can retrieve respective configuration parameter data associated with the context value (and associated application) from their respective data stores and reconfigure themselves, by reconfiguring respective configuration parameters, based at least in part on the respective configuration parameter data associated with the context value. A single write operation to write a context value to the context select component 138 can facilitate switching the system 100, including the respective configurations of the respective resources, from one context associated with an application to another context associated with another application.

For instance, during a first time period, the system 100 can be operating under a first context associated with a first context value (e.g., 1), wherein a first application (e.g., application$_1$ 120) can be accessing and using all or a portion of the resources to which the first application is authorized to access in accordance with first access rights of the first application (e.g., in accordance with first authentication credentials of the first application). During this first time period, the respective resources (e.g., function blocks (e.g., 108, 110, and/or 112, . . . ) and associated BPUs (e.g., 114, 116, 118, . . . ), DMA engine 102, . . . ) of the system 100 can be respectively configured based at least in part on respective configuration parameter data associated with the first application. For example, during this first time period, function block$_1$ 108 can be configured in accordance with appropriate configuration parameters based at least in part on configuration parameter data$_{11}$ 202 relating to application$_1$ 120 (and retrieved from DS$_1$ 128). Function block$_2$ 110 can be configured in accordance with appropriate configuration parameters based at least in part on configuration parameter data$_{12}$ 204 relating to application$_1$ 120 (and retrieved from DS$_2$ 130). Function block$_N$112 can be configured in accordance with appropriate configuration parameters based at least in part on configuration parameter data$_{1N}$ 206 relating to application$_1$ 120 (and retrieved from DS$_N$ 132). The DMA engine 102 can be configured in accordance with appropriate configuration parameters based at least in part on configuration parameter data$_{1DMA}$ 208 relating to application$_1$ 120 (and retrieved from DS$_{DMA}$ 134).

During the first time period, the resource management component 126 and the respective resources (e.g., function blocks (e.g., 108, 110, and/or 112, . . . ) and associated BPUs (e.g., 114, 116, 118, . . . ), DMA engine 102, . . . ) can control access to and use of the resources by the first application (e.g., application$_1$ 120) based at least in part on the respective configuration parameter data of the respective resources. For example, in accordance with the access rights the first application (e.g., application$_1$ 120) has to the respective resources, the first application may be permitted to have access to and use of function block$_1$ 108 and function block$_3$, but not function block$_2$ 110. Function block$_1$ 108, function block$_2$ 110, and function block$_3$ can be respectively configured, based at least in part on respective configuration parameter data associated with the first application, to enable the first application to access and use of function block$_1$ 108 and function block$_3$, but to be denied access to and use of function block$_2$ 110.

In accordance with a schedule that specifies respective time periods that respective applications (e.g., 120, 122, 124, . . . ) can access the resources or in response to an event, it can be desired to change the context of the system 100 from the first context to the second context (e.g., to swap out the first application and swap in the second application). The resource management component 126 can generate a second context value (e.g., 2) associated with the second context and second application (e.g., application$_2$ 122) to facilitate changing the context of the system 100.

At the time the change in context is desired, the DMA engine 102 may (or may not) be performing one or more operations (e.g., DMA operations) with respect to the first application (e.g., application$_1$ 120). To facilitate a desirable transition from the first context to the second context, the resource management component 126 can transmit a message (e.g., notification message) to the DMA engine 102 to notify the DMA engine 102 that the context of the system 100 is going to be changed (e.g., an application swap is going to occur) and any current operations are to be suspended.

In response to the message and upcoming change in context, the DMA engine 102 can suspend (e.g., cease, stop, or pause) any operations being performed with respect to one or more function blocks, in connection with the first application (e.g., application$_1$ 120), in accordance with respective procedures associated with and/or specified by the one or more function blocks. In some embodiments (e.g., when in accordance with the respective procedures associated with the one or more function blocks), the DMA engine 102 can suspend or facilitate suspending the operation(s) being performed with respect to one or more function blocks, and the DMA engine 102, function block(s) (e.g., 108, 110, and/or 112), BPUs (e.g., 114, 116, 118, . . . ), and/or other resources can save (e.g., store in the data store 104 or other data store (e.g., 128, 130, 132, and/or 134) operation information, such as information regarding the state the DMA engine 102 and/or function block(s) was in at the time the operation(s) was paused, data values (e.g., intermediate or final data values) associated with the operation(s) that were already determined or calculated during the operation(s), and/or other information.

In certain embodiments, after the suspension of the operation(s) by or facilitated by the DMA engine 102 has been completed in accordance with the applicable procedure(s) associated with the function block(s), the DMA engine 102 can communicate a message to the resource management component 126 to notify the resource management component 126 that the operation(s) has been suspended. In other embodiments, the resource management component 126 can monitor the DMA engine 102 and function blocks (e.g., 108, 110, 112, . . . ) and can identify or determine when the suspension of the operation(s) has been completed in accordance with the applicable procedure(s) associated with the function block(s).

In response to the suspension of the operation(s) associated with the DMA engine 102 and the one or more function blocks, the resource management component 126 can communicate the second context value (e.g., 2) associated with the second context and second application (e.g., application$_2$ 122) to the context select component 138 (e.g., in a single write operation). The DMA engine 102, the function blocks (e.g., 108, 110, 112, . . . ), BPUs (e.g., 114, 116, 118, . . . ), and/or other resources of the system 100 can monitor the context select component 138, and can detect the change in the context value stored in the context select component 138 to the second context value (e.g., 2) associated with the second application.

In response to detecting the change from the first context value to the second context value in the context select component 138, the DMA engine 102, function blocks (e.g., 108, 110, 112, . . . ), BPUs (e.g., 114, 116, 118, . . . ), and/or other resources of the system 100 can determine which configuration parameter data is associated with the second context value by each resource referencing the second context value in the configuration table (e.g., portion of the distributed configuration table) stored in the respective data store of or associated with the resource and determining or identifying the configuration parameter data associated with the second context value in the configuration table. After determining or identifying the appropriate respective configuration parameter data associated with the second context value, the DMA engine 102, function blocks (e.g., 108, 110, 112, . . . ), BPUs (e.g., 114, 116, 118, . . . ), and/or other resources of the system 100 each can access the appropriate respective configuration parameter data from their respective data stores (e.g., 128, 130, 132, and/or 134, . . . ) based at least in part on the second context value stored in the context select component 138, and the DMA engine 102, function blocks (e.g., 108, 110, 112, . . . ), BPUs (e.g., 114, 116, 118, . . . ), and/or other resources can be reconfigured (e.g., can reconfigured themselves) based at least in part on the respective configuration parameter data associated with the second context and associated second context value. The respective resources (e.g., function blocks and associated BPUs, DMA engine, . . . ) thereby can be simultaneously or substantially simultaneously transitioned (e.g., reconfigured) from the first context associated with the first application (e.g., application$_1$ 120) to the second context associated with the second application (e.g., application$_2$ 122).

For example, function block$_1$ 108 can be reconfigured in accordance with appropriate configuration parameters based at least in part on configuration parameter data$_{21}$ 210 relating to application$_2$ 122 (and retrieved from DS$_1$ 128). Function block$_2$ 110 can be reconfigured in accordance with appropriate configuration parameters based at least in part on configuration parameter data$_{22}$ 212 relating to application$_2$ 122 (and retrieved from DS$_2$ 130). Function block$_N$ 112 can be reconfigured in accordance with appropriate configuration parameters based at least in part on configuration parameter data$_{2N}$ 214 relating to application$_2$ 122 (and retrieved from DS$_N$ 132). The DMA engine 102 can be reconfigured in accordance with appropriate configuration parameters based at least in part on configuration parameter data$_{2DMA}$ 216 relating to application$_2$ 122 (and retrieved from DS$_{DMA}$ 134).

If, during a previous time period the second application had been accessing the resources of the system 100 (e.g., prior to the first time period when the first application was accessing all or a portion of the resources), an operation(s) had been suspended with respect to the DMA engine 102 and a function block(s) (e.g., 108, 110, and/or 112), the saved operation data associated with that operation(s) can be retrieved from the data store(s) (e.g., 104, 128, 130, 132, and/or 134) and used to facilitate resuming the operation(s) from the point the operation(s) had been paused, and the operation(s) can be completed.

During the second time period, the resource management component 126 and the respective resources (e.g., function blocks (e.g., 108, 110, and/or 112, . . . ) and associated BPUs (e.g., 114, 116, 118, . . . ), DMA engine 102, . . . ) can control access to and use of the resources by the second application (e.g., application$_2$ 122) based at least in part on the respective configuration parameter data of the respective resources with respect to the second application. For example, in accordance with the access rights the second application (e.g., application$_2$ 122) has to the respective resources, the second application may be permitted to have access to and use of function block$_1$ 108 and function block$_2$ 110, but not function block$_3$ or function block$_4$. Function block$_1$ 108, function block$_2$ 110, function block$_3$ and function block$_4$ can be respectively configured, based at least in part on respective configuration parameter data associated with the second application, to enable the second application to access and use of function block$_1$ 108 and function block$_2$ 110, but to not be able to access and use function block$_3$ and function block$_4$.

It is to be appreciated that, in some embodiments, the context select component 138 can receive, store, and provide (e.g., simultaneously or substantially simultaneously) multiple context values for use with regard to respective function blocks (e.g., 108, 110, 112, . . . ), BPUs (e.g., 114, 116, 118, . . . ), DMA engine 102, and/or other components of the system 100, and/or a complex or hybrid context value, wherein part (e.g., a subset of bits of data having a value) of the complex or hybrid context value can be applicable to a subset of components (e.g., resources, such as function blocks, BPUs, and/or DMA engine(s)) and another part (e.g., another subset of bits of data having another value) of the complex or hybrid context value can be applicable to another subset of components (e.g., other resources, such as other function blocks, BPUs, and/or DMA engine(s)). For example, multiple complex values, or a complex or hybrid context value, can be used when the system 100 employs a multi-core processing system.

In that regard, in one or more embodiments, the principles of the disclosed subject matter can be applicable to and expanded to employ a multi-core processing system, wherein there can be parallel processing of data and performance of operations by a plurality of processors and/or a plurality of DMA engines, comprising the DMA engine 102. With respect to a particular function (e.g., data compression; or data encryption; or data calculations; . . . ), there can be multiple resources that can perform that same particular function. For instance, a first processor and/or first DMA engine of the multi-core processing system (e.g., system 100 comprising a multi-core processing system) can access a first function block that can perform that particular function based at least in part on a first context and associated first context value with respect to a first application, and in parallel (e.g., simultaneously or substantially simultaneously), a second processor and/or a second DMA engine of the multi-core processing system can access a second function block that can perform that same particular function based at least in part on a second context and associated second context value with respect to a second application, and so on. The first context value can be loaded in a first context select component (e.g., 138) (or alternatively the first context value can be one of multiple complex values stored in the context select component 138 or a first part of a complex or hybrid context value stored in the context select component 138), and a next available function block of the function blocks that perform that particular function can be reconfigured based on the configuration parameter data associated with the first context value, wherein the other function blocks that can perform that particular function do not switch context to the first context. The second context value can be loaded in a second context select component (or alternatively the second context value can be another of multiple complex values stored in the context select component 138 or can be a second part of the complex or hybrid context value stored in the context select component 138), and a next available function block of the function blocks (e.g., the next function block in a bank or queue of function blocks that can perform that particular function) can be reconfigured based at least in part on the configuration parameter data associated with the second context value, wherein the other function blocks that can perform that particular function do not switch context to the second context, and wherein the function block that is associated with the first context can remain in the first context.

It is to be appreciated and understood that, while the resource management component 126 is depicted as being a component separate from other components, in other embodiments, all or a portion of the resource management component 126 can be part of one or more other components, such as, for example, the DMA engine 102, operating system component 106, and/or other component of the system 100.

The disclosed subject matter, by pre-loading a desired number of versions of configuration parameter data associated with respective applications in respective resources (e.g., function blocks (and associated BPUs), DMA engine, . . . ) and reconfiguring the respective resources based at least in part on the respective configuration parameter data, in accordance with a context value that is associated with an application and is detected in the context select component by the respective resources, can efficiently execute a schedule (e.g., RTOS schedule), transition between different applications, and control access to the respective resources by the applications, as compared to other systems, devices, or techniques. With regard to other systems, devices, or techniques, the other systems, devices, or techniques typically can result in multiple tables or items of configuration parameter data being loaded into resources each time an application is swapped out for another application during execution of the schedule.

Also, the disclosed subject matter can facilitate ensuring that, during operation of the system, one application does not interfere with another application, for example, with respect to accessing and using resources of the system. The disclosed subject matter can establish desirable (e.g., appropriate, suitable) boundaries for resources, including input/output resources, of the system to prevent interference by one application with another application.

Figure 3:
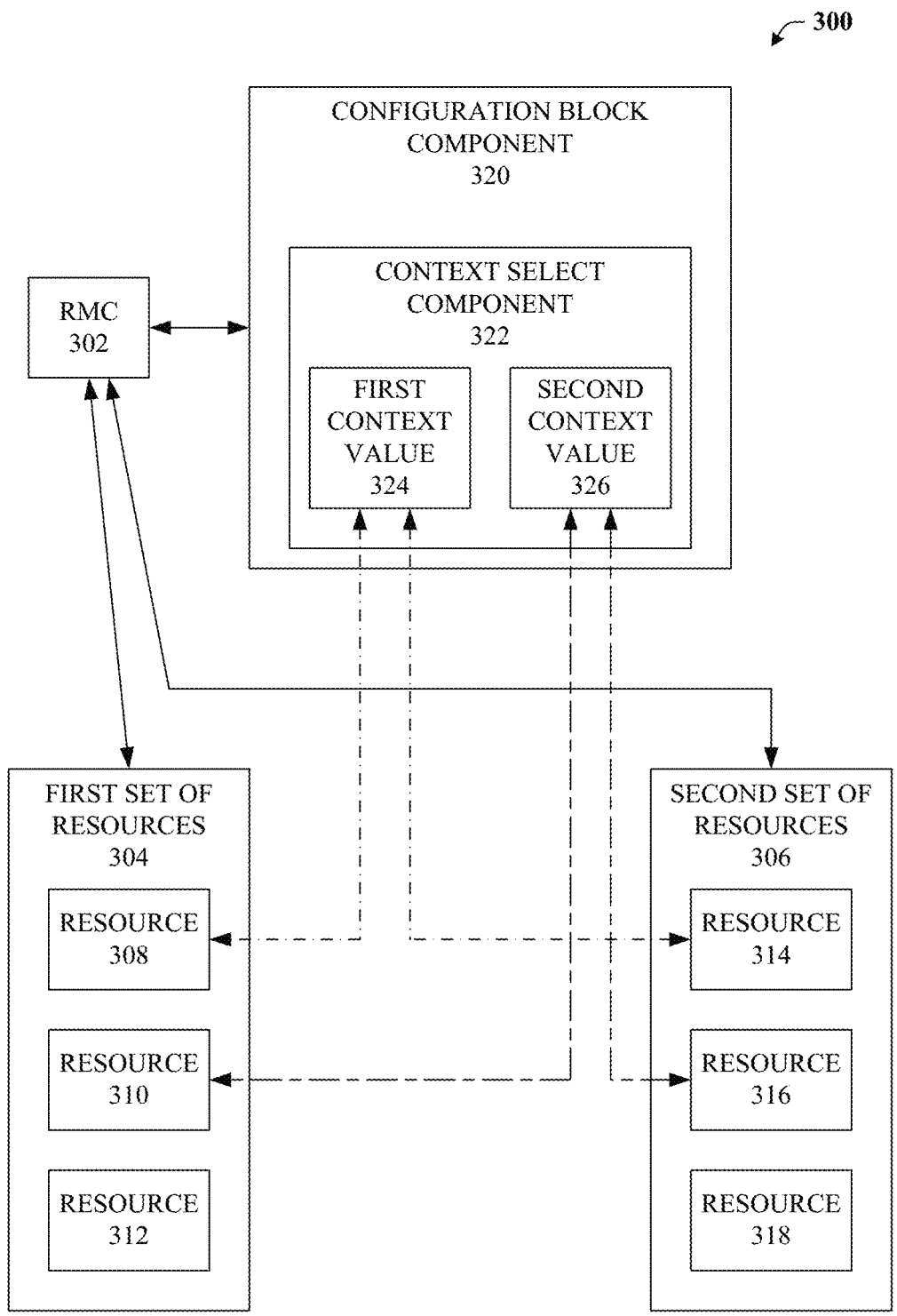
FIG. 3 depicts a block diagram of an example system that can employ a complex or hybrid context value to facilitate transitioning between different contexts and controlling access to resources in a multi-core processing system, in accordance with one or more embodiments of the disclosed subject matter.

Turning to FIG. 3, FIG. 3 depicts a block diagram of an example system 300 that can employ a complex or hybrid context value to facilitate transitioning between different contexts and controlling access to resources in a multi-core processing system, in accordance with one or more embodiments of the disclosed subject matter. The system 300 can comprise a resource management component 302 that can be employed to facilitate controlling access to and use of resources, controlling the context of the system (e.g., controlling the swapping in and out of applications associated with respective contexts), and/or other functions or operations of the system 300.

The system 300 also can comprise resources, such as one or more DMA engines, function blocks and associated BPUs, and/or other resources. For example, the system 300 can comprise a first set of resources 304 that can comprise first resources that can perform a first particular function with respect to data and a second set of resources 306 that can perform a second particular function with respect to data. In some embodiments, the first set of resources 304 can comprise resource 308, resource 310, and resource 312 that each can perform the same first particular function, and the second set of resources 306 can comprise resource 314, resource 316, and resource 318 that each can perform the same second particular function. In certain embodiments, the first set of resources 304 can be in a first queue or bank, and the second set of resources 306 can be in a second queue or bank.

The system 300 can comprise a configuration block component 320 that can facilitate configuring the respective resources of the system 300. The configuration block component 320 can comprise a context select component 322 that can be employed to receive, from the resource management component 302, respective context values associated with respective (e.g., multiple) contexts (and respective applications) of the system 300, which can employ a multi-core processing system, to facilitate controlling access to and use of the resources by multiple applications in parallel.

In some embodiments, the context select component 322 can be or comprise one or more registers (e.g., one or more context select registers) in which the context values can be stored.

For example, the resource management component 302 can communicate a first context value 324 to the context select component 322, which can store the first context value 324 in a first field or register (e.g., first context select register) of the context select component 322, wherein the first context value 324 can indicate a first context of the system 300 associated with a first application (not shown in FIG. 3). At the same or substantially the same time, or during a first time period associated with the first context, the resource management component 302 can communicate a second context value 326 to the context select component 322, which can store the second context value 326 in a second field or register (e.g., second context select register) of the context select component 322, wherein the second context value 326 can indicate a second context of the system 300 associated with a second application (not shown in FIG. 3).

In connection with the first context and associated first application, based at least in part on first context value 324, the resource 308 of the first set of resources 304 associated with the first particular function and the resource 314 of the second set of resources 306 associated with the second particular function can be reconfigured based at least in part on respective configuration parameter values associated with the first context value 324. In some embodiments, an indicator or flag (e.g., an indicator value) associated with a resource (e.g., resource 308, resource 314) can indicate that the resource is being used, for example, with respect to a particular context associated with a particular application (e.g., first context associated with the first application) to facilitate not interfering with that resource while it is used in connection with that particular context and facilitate selection of another resource (e.g., an available resource of the queue or bank) that is available to perform the particular function.

In connection with the second context and associated second application, based at least in part on second context value 326, the resource 310 of the first set of resources 304 associated with the first particular function and the resource 316 of the second set of resources associated with the second particular function can be reconfigured based at least in part on respective configuration parameter values associated with the second context value 326. In some embodiments, an indicator or flag (e.g., an indicator value) associated with a resource (e.g., resource 310, resource 316) can indicate that the resource is being used, for example, with respect to the second context associated with the second application to facilitate not interfering with that resource while it is used in connection with the second context and facilitate selection of another resource (e.g., an available resource of the queue or bank) that is available to perform the particular function. The resources (e.g., 310 and 316) associated with the second context can perform operations or tasks on data in connection with the second application, while, in parallel, the other resources (e.g., 308 and 314) can perform operations or tasks on data in connection with the first application.

Figure 4:
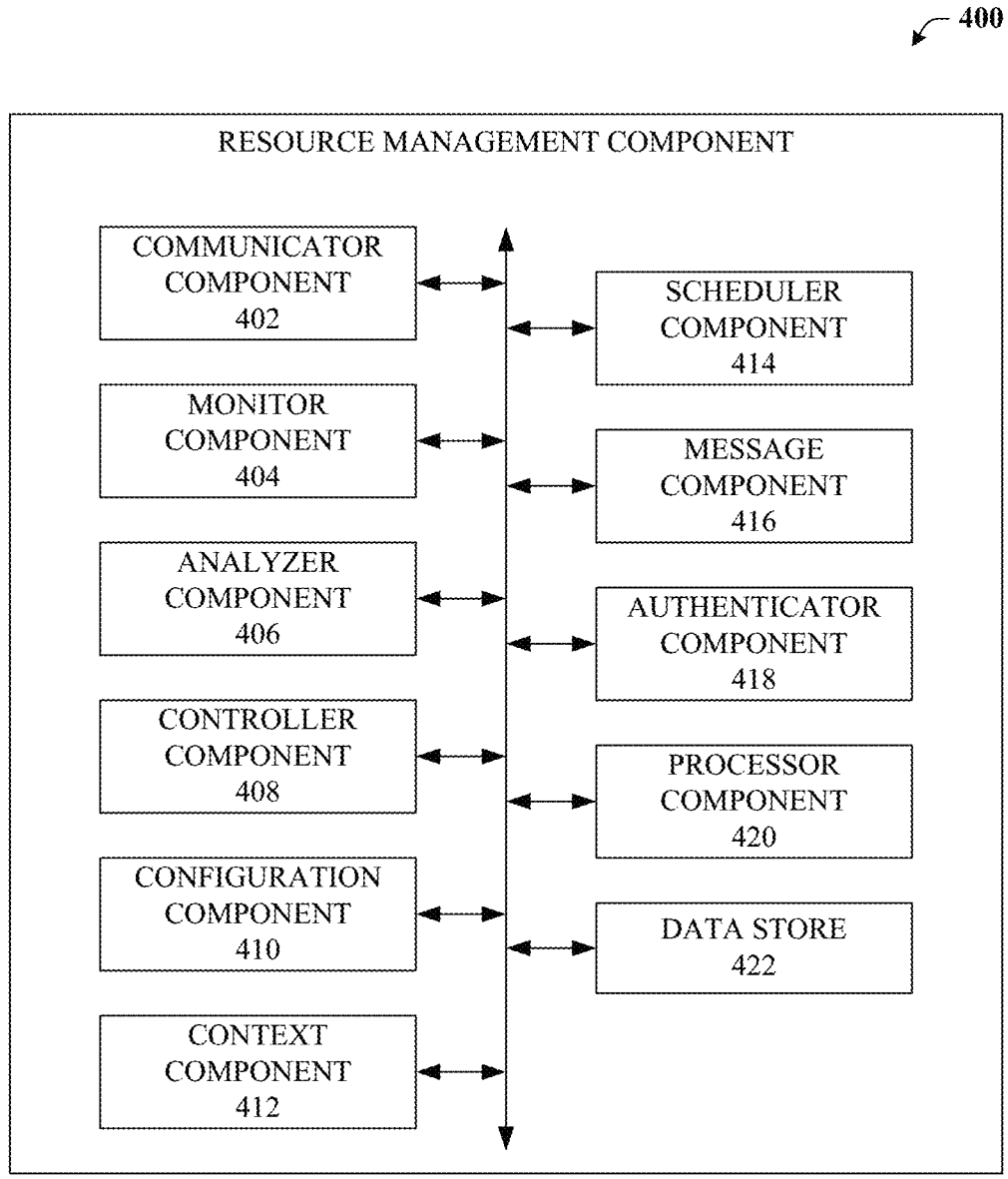
FIG. 4 illustrates a block diagram of an example resource management component that can facilitate controlling access to resources of a system and transitioning the system between different contexts, in accordance with one or more embodiments of the disclosed subject matter.

FIG. 4 illustrates a block diagram of an example resource management component 400 that can facilitate controlling access to resources of a system and transitioning the system between different contexts, in accordance with one or more embodiments of the disclosed subject matter. The resource management component 400 can comprise a communicator component 402 that can communicate data to components of the system (e.g., cSoC) and/or to external components, systems, or devices, and can receive data from components of the system and/or from external components, systems, or devices. For example, the communicator component 402 can communicate respective configuration parameter data and respectively associated context values to respective resources to facilitate pre-loading the respective configuration parameter data and the respectively associated context values in respective data stores associated with the respective resources. As another example, the communicator component 402 can communicate a context value to a context select component to facilitate changing the context of the system from one context (e.g., from one application) to another context (e.g., to another application) associated with the context value. As still another example, the communicator component 402 can communicate a message to the DMA engine to notify the DMA engine that the system is going to transition from one context to another context.

The resource management component 400 also can comprise a monitor component 404 that can monitor operations being performed by the system. The monitor component 404 also can monitor the suspension of an operation(s) when a transition between contexts is occurring to swap out one application and swap in another application.

The resource management component 400 can include an analyzer component 406 that can analyze data to facilitate performing various operations of the resource management component 400 or other components associated with the resource management component 400. For example, the analyzer component 406 can analyze data to facilitate determining or implementing a schedule for allowing respective applications to access respective resources of the system (e.g., cSoC) at respective times, determining respective configuration parameter data to be pre-loaded to respective resources, determining a context value(s) to employ at a particular time, determining one or more resources with regard to which an application is permitted to have access, determining respective access rights or respective levels of access that an application can be granted with respect to respective resources, and/or determining one or more resources with regard to which an application is to be denied access.

The resource management component 400 further can comprise a controller component 408 that can control operations relating to processing data, controlling access to resources, performing the pre-loading of respective configuration parameter data to respective resources, determining context values, determining a schedule that schedules access to resources for applications, determining whether a transition between contexts and respective applications is to occur, determining whether a condition (e.g., suspension of an operation(s) associated with a current context and associated application) has been satisfied to allow the transition between contexts and respective applications, and/or other operations. The controller component 408 can facilitate controlling operations being performed by various components of the resource management component 400, controlling data flow between various components of the resource management component 400, controlling data flow between the resource management component 400 and other components or systems associated with the resource management component 400, etc.

The resource management component 400 can include a configuration component 410 that can generate, receive (e.g., from an external data source), determine, and/or facilitate communication of respective configuration parameter data of respective resources with regard to respective applications. The configuration component 410 can facilitate pre-loading the respective configuration parameter data associated with the respective resources to the respective resources, wherein the communicator component 402 can send the respective configuration parameter data to the respective resources.

The resource management component 400 also can comprise a context component 412 that can generate respective context values to use to facilitate changing the context of the system (and correspondingly an application using the resources of the system) at desired times (e.g., in accordance with the schedule). The communicator component 402 can send a context value to the context select component to facilitate changing the context of the system.

The resource management component 400 can include a scheduler component 414 that generate a schedule to allocate respective time periods to applications to access one or more resources of the system. The schedule can be an RTOS schedule, for example. The scheduling of access to the resources of the system 100 for the applications can be based at least in part on time, relative priorities of applications with respect to each other, events (e.g., external events) that occur which can result in a particular application(s) being granted access to resources over another application(s) in response to the event, and/or other considerations.

The resource management component 400 can comprise a message component 416 that generate and facilitate sending (e.g., via the communicator component 402) various types of messages to facilitate controlling operations of the resource management component 400 and the system. For example, the message component 416 can generate a message that can be sent to the DMA engine to notify the DMA engine that the context of the system is going to be changed. In response the DMA engine can suspend any operations (e.g., DMA operations) being performed in accordance with respective procedures associated with respective resources (e.g., function blocks).

The resource management component 400 also can include an authenticator component 418 that that can employ authentication protocols to facilitate security of data associated with a memory (e.g., a data store), the system (e.g., cSoC), a resource, and/or an application, in accordance with the disclosed subject matter. For example, the authenticator component 418 can solicit authentication data (e.g., an authentication credential) from an entity (e.g., an application, a user, a device), and, upon the authentication data so solicited, can be employed, individually and/or in conjunction with information acquired and ascertained as a result of biometric modalities employed, to facilitate control access to the memory, the system, the resource, or the application. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authenticator component 418 can implement one or more machine-implemented techniques to identify an entity by its unique physical and behavioral characteristics and attributes. Biometric modalities that can be employed can include, for example, finger print identification that can scan the corrugated ridges of skin that are non-continuous and form a pattern that can provide distinguishing features to identify an entity, face recognition wherein measurements of key points on an entity's face can provide a unique pattern that can be associated with the entity, and iris recognition that measures from the outer edge towards the pupil the patterns associated with the colored part of the eye—the iris—to detect unique features associated with an entity's iris.

In response to verifying that the received authentication data matches stored authentication data relating to the entity, the authenticator component 418 can grant a set of access rights to the memory, the system, one or more resources, or one or more applications, in accordance with access rights that the entity is permitted to have. In response to not being able to verify that the received authentication data matches stored authentication data relating to the entity, the authenticator component 418 can deny access rights to the memory, the device, the system, the resources, or the applications, or can grant, to the entity, limited access rights to the memory, the device, the system, one or more resources, or one or more applications, wherein the limited access rights can be access rights that are permitted to be granted to non- or un-authorized entities. The authenticator component 418 also can provide an entity with one or more additional opportunities to provide valid authentication data up to a defined maximum number of authentication attempts.

The resource management component 400 can comprise a processor component 420 that can work in conjunction with the other components (e.g., communicator component 402, monitor component 404, analyzer component 406, . . . ) to facilitate performing the various functions of the resource management component 400. The processor component 420 can employ one or more processors, microprocessors, or controllers that can process data, such as information relating to resources, respective configuration parameter data associated with respective resources, context of the system, applications, scheduling of access to resources by applications, and/or other information, to facilitate operation of the resource management component 400, as more fully disclosed herein, and control data flow between the resource management component 400 and other components associated with the resource management component 400.

The resource management component 400 also can include a data store 422 that can store data structures (e.g., user data, metadata), code structure(s) (e.g., modules, objects, hashes, classes, procedures) or instructions, information relating to resources, respective configuration parameter data associated with respective resources, context of the system, applications, scheduling of access to resources by applications, and/or other information, to facilitate controlling operations associated with the resource management component 400. In an aspect, the processor component 420 can be functionally coupled (e.g., through a memory bus) to the data store 422 in order to store and retrieve information desired to operate and/or confer functionality, at least in part, to communicator component 402, monitor component 404, analyzer component 406, etc., and/or substantially any other operational aspects of the resource management component 400.

It is also to be understood and appreciated that cryptographic protocols can be employed to facilitate security of data associated with a memory (e.g., data store), content, the system, resources, applications, or the resource management component in accordance with the disclosed subject matter. For example, a cryptographic component (e.g., cryptographic engine) can be employed and can facilitate encrypting and/or decrypting data (e.g., content, content-related information, entity-related information) to facilitate securing data being written to, stored in, and/or read from the memory, and/or data being communicated to or from the system. The cryptographic component can provide symmetric cryptographic tools and accelerators (e.g., Twofish, Blowfish, AES, TDES, IDEA, CAST5, RC4, etc.) to ensure that the system, a memory, a resource, or an application, or portions thereof, can only be accessed by those entities authorized and/or authenticated to do so. The cryptographic component can also provide asymmetric cryptographic accelerators and tools (e.g., RSA, Digital Signature Standard (DSS), and the like) to ensure that the system, a memory (e.g., a specified partition in the memory), a resource, or an application, or portions thereof, only can be accessed by those entities that are authorized and certified to do so. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to ensure that access to the system, a memory, a resource, or an application, or portions thereof, is confined to those entities authorized to gain access.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 5-8 illustrate methods and/or flow diagrams in accordance with the disclosed subject matter. For simplicity of explanation, the methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or storage media.

Figure 5:
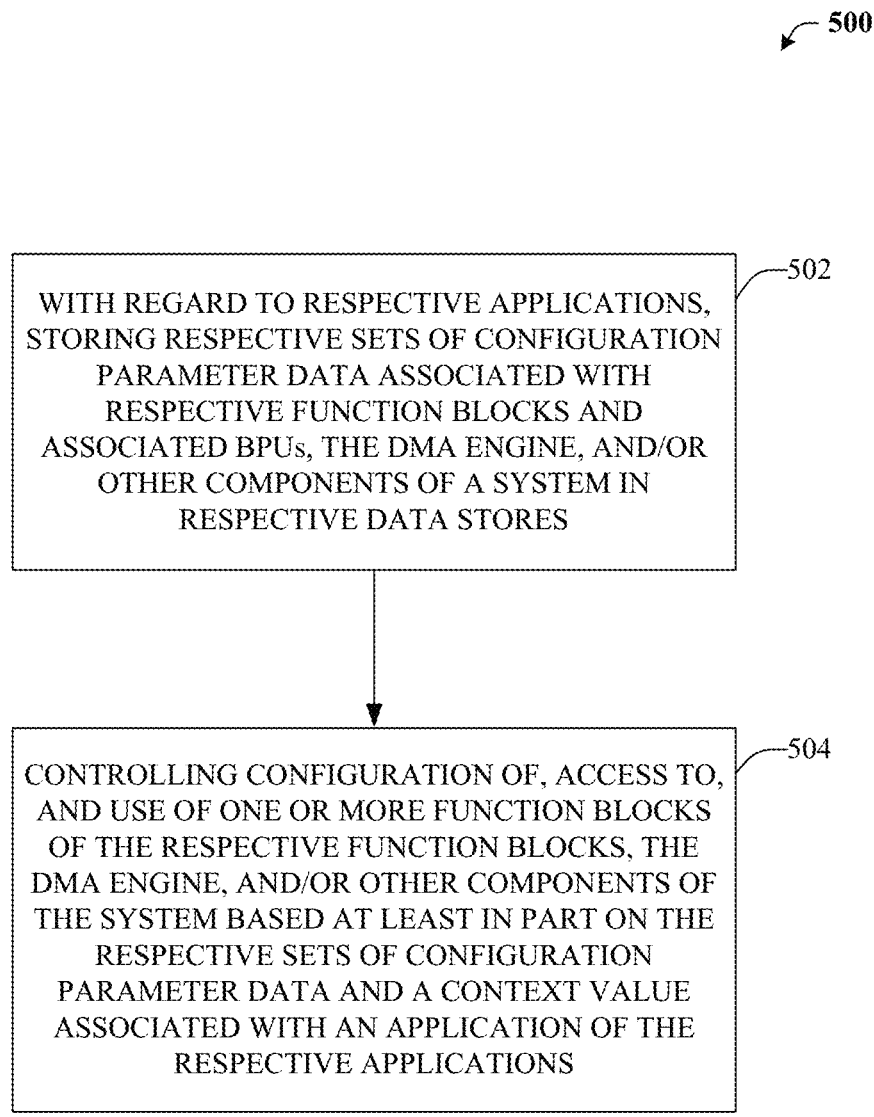
FIG. 5 illustrates a flow diagram of an example method for employing a context value to facilitate controlling access to resources of a system, in accordance with one or more embodiments of the disclosed subject matter.

Referring to FIG. 5, illustrated is a flow diagram of an example method 500 for employing a context value to facilitate controlling access to resources of a system (e.g., a cSoC), in accordance with one or more embodiments of the disclosed subject matter. As an example, the method 500 can be employed by a resource management component, operating system component, and/or other component (e.g., DMA engine).

At reference numeral 502, with regard to respective applications, respective sets of configuration parameter data associated with respective function blocks and associated BPUs, the DMA engine, and/or other components of a system (e.g., a cSoC) can be stored in respective data stores. For instance, with regard to respective applications, the resource management component or another component can store of facilitate storing (e.g., pre-loading and storing) respective sets of configuration parameter data associated with respective function blocks and BPUs, the DMA engine, and/or other components (e.g., other resources) of a system in respective data stores (e.g., respective data stores of or associated with the respective function blocks, BPUs, DMA engine, and/or other components of the system). With regard to respective applications, the respective sets of configuration parameter data can be associated with respective context values.

At reference numeral 504, configuration of, access to, and use of one or more function blocks of the respective function blocks, the DMA engine, and/or other components of the system can be controlled based at least in part on the respective sets of configuration parameter data and a context value associated with an application of the respective applications. For instance, at a given time, when a particular application is to be permitted to gain access to certain resources associated with the system (e.g., by swapping out another application that had been permitted to gain access those or other resources associated with the system), the resource management component or the other component can determine the context value associated with that particular application based at least in part on determining or identifying the particular application. The resource management component or other component can select the context value and provide the context value to a context select component of a configuration block component of the system, wherein the context value can be stored in the context select component.

The one or more function blocks and associated BPUs, DMA engine, and/or other components of the system can detect and identify (e.g., read) the context value in the context select component, and can determine their respective configuration parameter data, and corresponding configuration parameters, based at least in part on the respective context value. The one or more function blocks, associated BPUs, DMA engine, and/or other components of the system can be respectively configured (e.g., can respectively configure themselves) based at least in part on the respective configuration parameter data associated with the one or more function blocks, BPUs, DMA engine, and/or other components of the system with respect to the particular application. During the period of time the particular application is selected for access to at least a portion of the resources (e.g., until another application is selected for access to resources, or a portion thereof), access to and use of the one or more function blocks of the respective function blocks, DMA engine, and/or other components of the system can be controlled based at least in part on the respective sets of configuration parameter data and the context value associated with the particular application.

Figure 6:
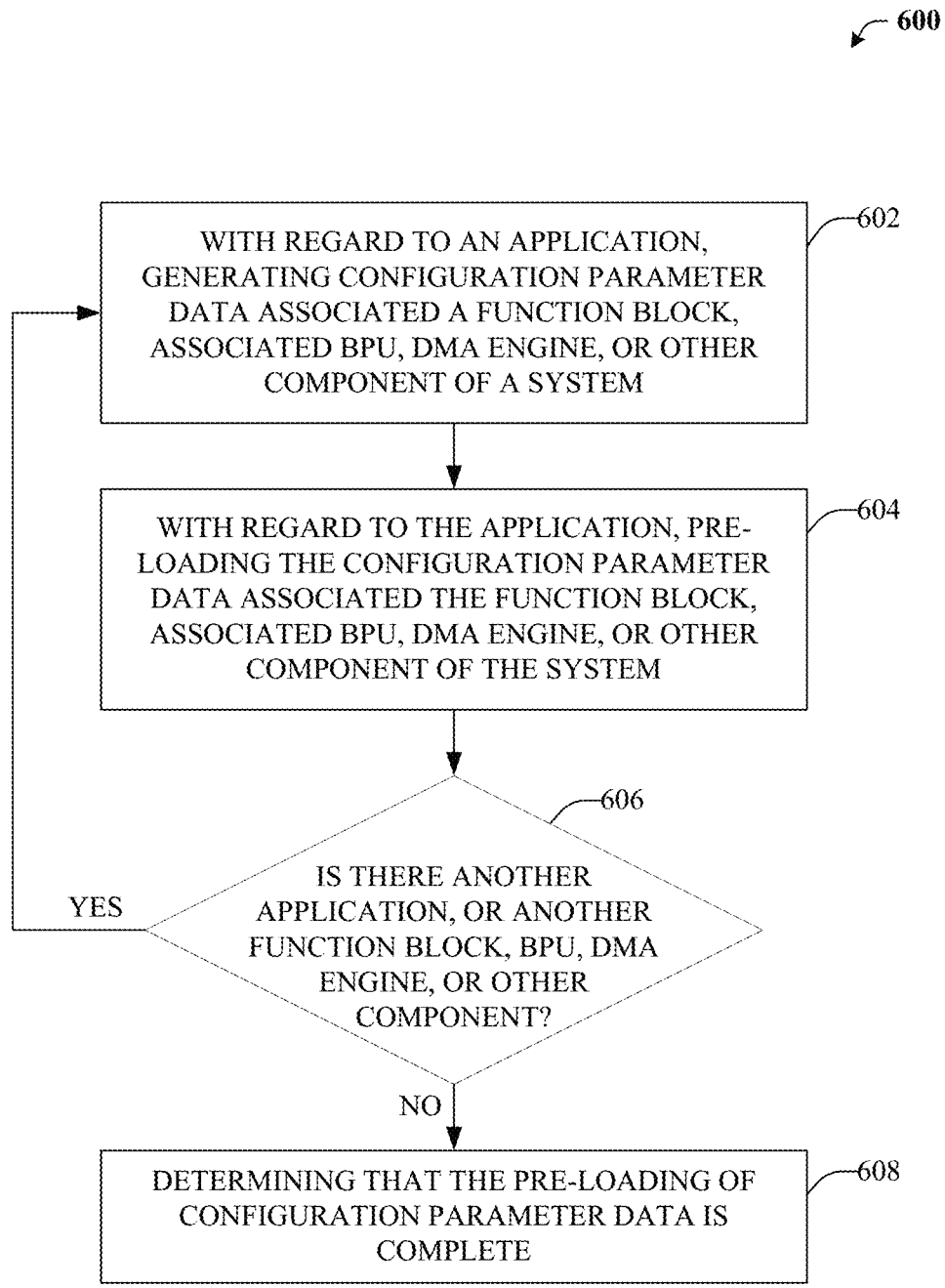
FIG. 6 presents a flow diagram of an example method for pre-loading and storing respective configuration parameter data in connection with respective applications to facilitate controlling resources of a system, in accordance with one or more embodiments and aspects of the disclosed subject matter.

FIG. 6 presents a flow diagram of an example method 600 for pre-loading and storing respective configuration parameter data in connection with respective applications to facilitate controlling resources of a system (e.g., a cSoC), in accordance with one or more embodiments and aspects of the disclosed subject matter. As an example, the method 600 can be employed by a resource management component, operating system component, and/or other component (e.g., DMA engine).

At reference numeral 602, with regard to an application, configuration parameter data associated a function block, associated BPU, DMA engine, or other component of a system can be generated. With regard to each application, and with regard to each (or a desired portion thereof) function block, associated BPU, DMA engine, or other component of the system, respective configuration parameter data can be determined and generated. For example, the resource management component or other component can determine, generate, and/or receive first configuration parameter data associated with (e.g., for use with) a first function block in connection with use of a first application, and can determine, generate, and/or receive second configuration parameter data associated with (e.g., for use with) the first function block in connection with use of a second application.

At reference numeral 604, with regard to the application, the configuration parameter data associated the function block, associated BPU, DMA engine, or other component of the system can be pre-loaded. For instance, the resource management component or other component can pre-load the configuration parameter data associated the function block, BPU, DMA engine, or other component of the system, with respect to the application, to the function block, BPU, DMA engine, or other component of the system. With regard to respective applications, respective configuration parameter data can be associated with respective context values, and the respective context values can be pre-loaded (e.g., by the resource management component or other component) in connection with the pre-loading of the respective configuration parameter data and associated with the respective configuration parameter data.

At reference numeral 606, a determination can be made regarding whether there is another application, or another function block and associated BPU, DMA engine, or other component of the system, with regard to which configuration parameter data has not been pre-loaded. The resource management component or other component can determine whether there is another application, or another function block and associated BPU, DMA engine, or other component of the system, with regard to which configuration parameter data associated with an application has not been pre-loaded.

If, at reference numeral 606, it is determined that there is another application, or another function block and associated BPU, DMA engine, or other component of the system, with regard to which configuration parameter data has not been pre-loaded, the method 600 can return to reference numeral 602, and the method 600 can continue to proceed from that point. For example, with regard to the application, if there remains another function block and associated BPU, DMA engine, or other component of the system with regard to which configuration parameter data associated with the application has not been pre-loaded, the method 600 can return to reference numeral 602 (e.g., the resource management component or other component can determine that the method 600 can return to reference numeral 602), wherein configuration parameter data suitable for use by the remaining function block and associated BPU, DMA engine, or other system component, with respect to the application, can be generated, and the method 600 can continue from that point. As another example, if, with regard to the application, the respective configuration parameter data has been pre-loaded to the function blocks and associated BPUs, DMA engine, and/or other system component(s) to which configuration parameter data is to be pre-loaded, but there is another application for which configuration parameter data has not been pre-loaded to the function blocks and associated BPUs, DMA engine, and/or other system component(s), the method 600 can return to reference numeral 602 (e.g., the resource management component or other component can determine that the method 600 can return to reference numeral 602), wherein configuration parameter data relating to the other application and suitable for use by a function block and associated BPU, DMA engine, or other system component can be generated, and the method 600 can continue from that point.

If, at reference numeral 606, it is determined that, with regard to each application, respective configuration parameter data has been pre-loaded to the function blocks and associated BPUs, DMA engine, and/or other system component(s) to which configuration parameter data is to be pre-loaded, at reference numeral 608, it can be determined that the pre-loading of configuration parameter data is complete. For instance, the resource management component or other component can determine that, with regard to each application, respective configuration parameter data has been pre-loaded to the function blocks and associated BPUs, DMA engine, and/or other system component(s) to which configuration parameter data is to be pre-loaded, and no other configuration parameter data remains to be pre-loaded. As a result, the resource management component or other component can determine that the pre-loading of configuration parameter data is complete.

Figure 7:
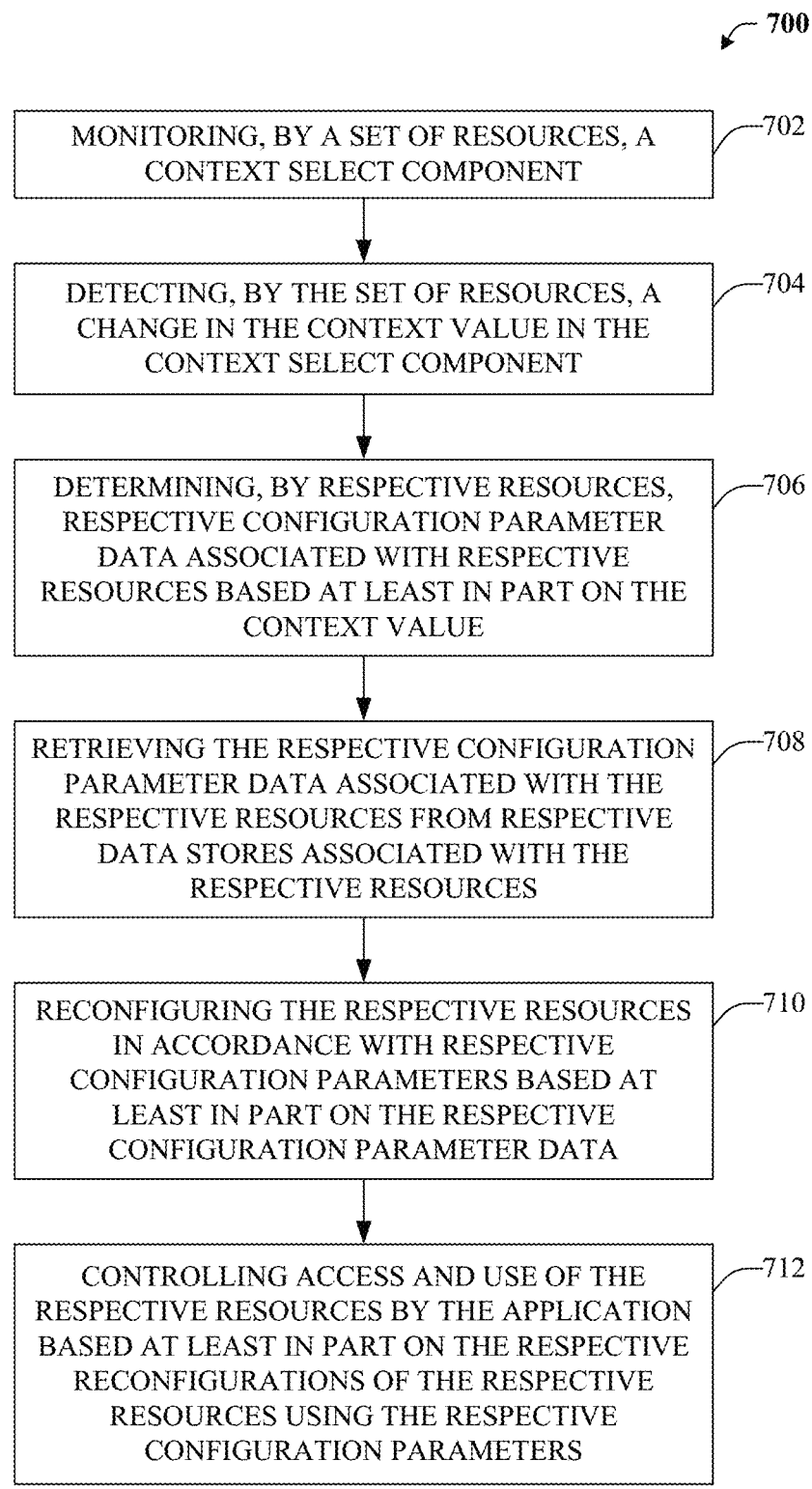
FIG. 7 depicts a flow diagram of an example method for reconfiguring resources of a system based at least in part on a context value, in accordance with one or more embodiments of the disclosed subject matter.

With regard to FIG. 7, depicted is a flow diagram of an example method 700 for reconfiguring resources of a system (e.g., a cSoC) based at least in part on a context value (e.g., in response to a change in context, such as a change in application), in accordance with one or more embodiments of the disclosed subject matter. As an example, the method 700 can be employed by function blocks, BPUs, DMA engine, resource management component, operating system component, and/or other component of the system.

At a given time, an application can be accessing and utilizing at least a portion of the resources (e.g., function blocks, DMA engine, . . . ) of the system to which the application is permitted access, wherein the application can be associated with a context and associated context value. The function blocks, BPUs, DMA engine, and/or other resources of the system can be configured, based at least in part on respective configuration data associated with such context value, in accordance with such context (e.g., based at least in part on the associated context value stored in the context select component).

At reference numeral 702, a context select component can be monitored by a set of resources. The set of resources (e.g., function blocks, associated BPUs, DMA engine, and/or another component(s) of the system) can monitor the context select component to facilitate determining whether the context of the system has been changed (e.g., determining whether the application has been swapped out for another application). The context select component (e.g., a context select register) can be part of the configuration block component of the system, for example.

At reference numeral 704, a change in the context value in the context select component can be detected by the set of resources. The resource management component or another system component can communicate (and load) a different context value associated with a different application to (into) the context select component. The set of resources (e.g., function blocks, associated BPUs, DMA engine, and/or another system component(s)) can detect the change in the context value in the context select component.

In some embodiments, if an operation(s), such as a DMA operation(s), is being performed using a function block(s) at a time when a change in the context of the system is about to occur (e.g., when a context value is about to be changed), the DMA engine (or another component, such as the resource management component) can suspend (e.g., cease, pause, stop, or interrupt) the operation(s) in accordance with the procedures associated with (e.g., specified by) that function block(s), as more fully described herein. Once the operation(s) has been suspended, the resource management component) can communicate the context value (e.g., the different or next context value associated with the different or next application) to update (e.g., change, modify) the context field in the context select component in the configuration block component to the context value.

At reference numeral 706, respective configuration parameter data associated with respective resources of the set of resources can be determined by the respective resources based at least in part on the context value. The respective resources can determine the respective configuration parameter data to use with respect to the application (e.g., different or next application) based at least in part on the context value associated with the application.

At reference numeral 708, the respective configuration parameter data associated with the respective resources can be retrieved from respective data stores associated with the respective resources. The respective resources can retrieve, obtain, or receive the respective configuration parameter data from the respective data stores.

At reference numeral 710, the respective resources can be reconfigured in accordance with respective configuration parameters based at least in part on the respective configuration parameter data. With regard to each of the respective resources, the resource can be reconfigured to employ the appropriate configuration parameters relating to the application (e.g., different application) based at least in part on the configuration parameter data the resource retrieved from its associated data store.

At reference numeral 712, access and use of the respective resources by the application can be controlled based at least in part on the respective reconfigurations of the respective resources using the respective configuration parameters. For example, a first resource can control access and use of the first resource by the application (e.g., the different or next application) based at least in part on a first reconfiguration of the first resource based at least in part on the first configuration parameters associated with the first resource and the application. Further, a second resource can control access and use of the second resource by the application based at least in part on a second reconfiguration of the second resource based at least in part on the second configuration parameters associated with the second resource and the application.

Figure 8:
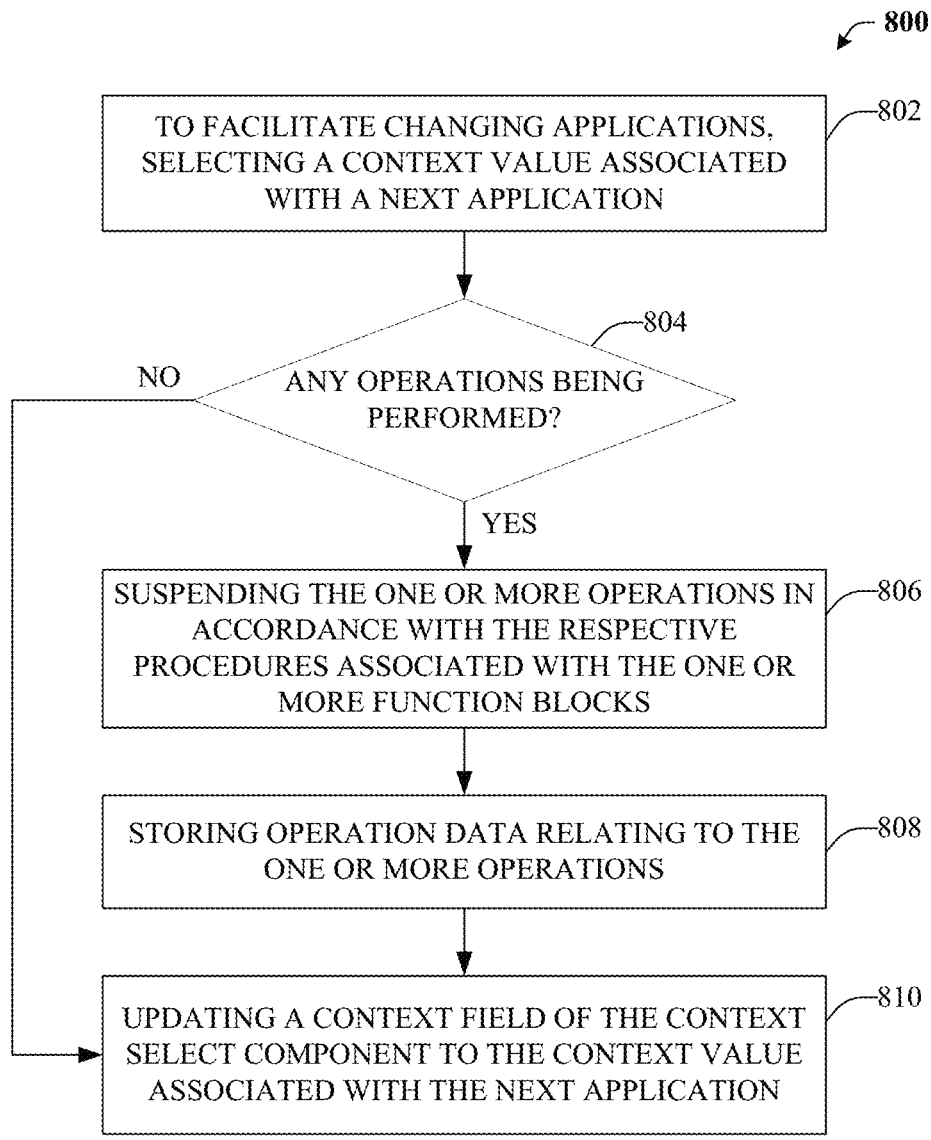
FIG. 8 illustrates a flow diagram of another example method for reconfiguring resources of a system based at least in part on a context value, in accordance with one or more embodiments of the disclosed subject matter.

FIG. 8 illustrates a flow diagram of another example method 800 for reconfiguring resources of a system (e.g., a cSoC) based at least in part on a context value (e.g., in response to a change in context, such as a change in application), in accordance with one or more embodiments of the disclosed subject matter. As an example, the method 800 can be employed by a resource management component, operating system, DMA engine, or other component.

At a given time, an application can be accessing and utilizing at least a portion of the resources (e.g., function blocks and associated BPUs, DMA engine, . . . ) of the system to which the application is permitted access, wherein the application can be associated with a context and associated context value. The function blocks and associated BPUs, DMA engine, and/or other resources of the system can be configured, based at least in part on respective configuration data associated with such context value, in accordance with such context (e.g., based at least in part on the associated context value stored in the context select component). At a subsequent time, it can be desired to change the context of the system to enable a next application to access and utilize certain resources, which can comprise resources that are the same as or different from the resources accessed by the application.

At reference numeral 802, to facilitate changing applications (e.g., swapping out applications), a context value associated with a next application can be selected. The resource management component can select the context value associated with the next application, for example, in accordance with a schedule or in response to an occurrence of an event.

At reference numeral 804, a determination can be made regarding whether one or more operations are being performed by the DMA engine using one or more function blocks in connection with the application. The resource management component, DMA engine, or another component can determine whether one or more operations are being performed by the DMA engine using one or more function blocks in connection with the application.

If, at reference numeral 804, it is determined that one or more operations are being performed by the DMA engine using one or more function blocks in connection with the application, at reference numeral 806, the one or more operations can be suspended in accordance with the respective procedures associated with the one or more function blocks. The DMA engine (or resource management component or other component) can facilitate suspending the one or more operations in accordance with the respective procedures associated with the one or more function blocks, as more fully disclosed herein.

At reference numeral 808, operation data relating to the one or more operations can be stored. The DMA engine (or resource management component or other component) can store the operation data relating to the one or more operations in a data store, wherein the operation data can relate to, for example, the state the DMA engine and/or function block(s) was in at the time the operation(s) was suspended, data values (e.g., intermediate or final data values) associated with the operation(s) that were already determined or calculated during the operation(s), and/or other information. The operation data can be used at a later time, when the application is swapped in again to access all or a portion of the resources of the system, to facilitate resuming performance of the operation(s) at or near the point(s) in the operation(s) where the operation(s) had been suspended at reference numeral 806.

At reference numeral 810, a context field of the context select component can be updated to the context value associated with the next application. For instance, in response to determining that the one or more operations have been suspended, the resource management component (or another component) can update the context field of the context select component to load the context value associated with the next application into the context field to facilitate changing the system to the next context (e.g., the context associated with the next application).

Referring again to reference numeral 804, if, at reference numeral 804, it is determined that no operations are being performed by the DMA engine using one or more function blocks in connection with the application, the method 800 can proceed to reference numeral 810, wherein the context field of the context select component can be updated to the context value associated with the next application.

From this point, the respective resources can facilitate detecting the change in context value in the context field of the context select component, determining respective configuration parameter data based at least in part on the context value, retrieving the respective configuration parameter data from respective data stores associated with the respective resources, reconfiguring the respective resources based at least in part on respective configuration parameters associated with the respective configuration parameter data, and controlling access and use of the respective resources based at least in part on the respective configurations (e.g., reconfigurations) of the respective resources in accordance with the respective configuration parameters, as more fully disclosed herein.

Figure 9:
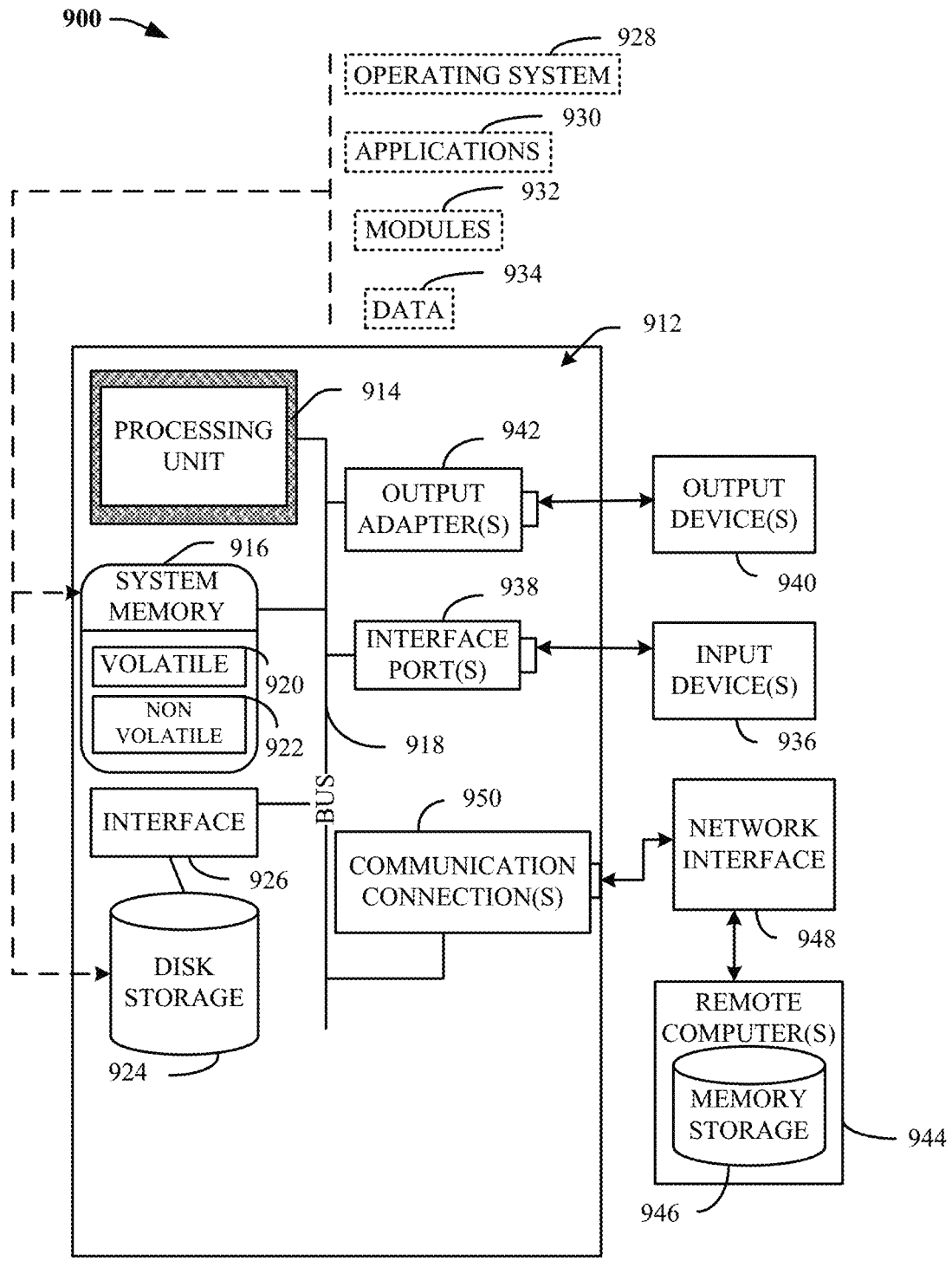
FIG. 9 is a schematic block diagram illustrating a suitable operating environment.
Figure 10:
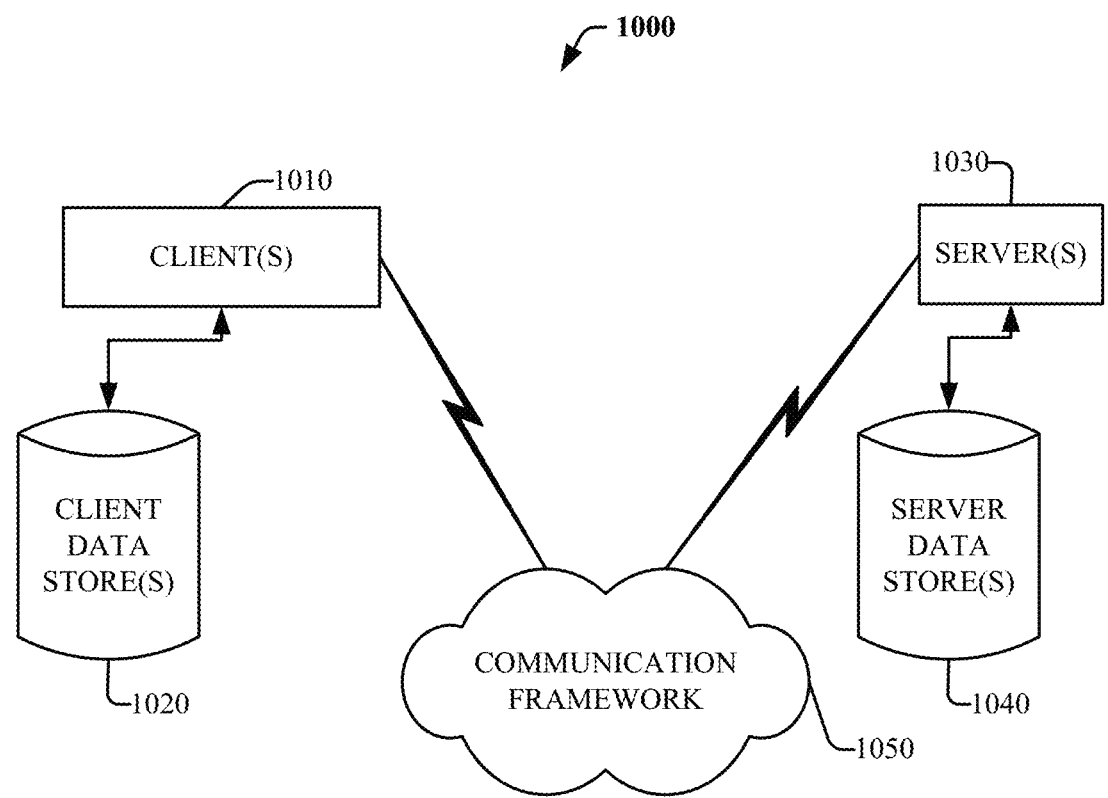
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented.

With reference to FIG. 9, a suitable environment 900 for implementing various aspects of this disclosure includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM). Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), Rambus dynamic RAM, and ferroelectric RAM (FeRAM).

Computer 912 also includes removable/non-removable, volatile/non-volatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computer system 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950.

Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 with which the subject matter of this disclosure can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   storing, by a system comprising a processor, respective sets of configuration data in respective resources of a system-on-chip device, wherein the respective sets of configuration data are associated with respective applications and the respective resources;
   controlling, by the system, configuration of and access to the respective resources based at least in part on the respective sets of configuration data associated with respective contexts relating to the respective applications and based at least in part on a context value in a context field of a configuration block, wherein the context value indicates a context of the respective contexts and an application of the respective applications that is associated with the context; and
   in response to detecting, in the context field of the configuration block, a change of the context value, reconfiguring the at least one of the respective resources from having first configuration parameters based at least in part on a portion of a first set of configuration data, of the respective sets of configuration data, to have second configuration parameters based at least in part on a portion of a second set of configuration data that is stored in the at least one of the respective resources and associated with the changed context value.

2. The method of claim 1, wherein the respective resources comprise a resource, wherein the context is a first context, wherein the respective contexts comprise the first context and a second context, wherein the context value is a first context value, wherein the application is a first application, wherein the first context is associated with the first application, the first context value, and the first set of configuration data, wherein the second context is associated with a second application of the respective applications, a second context value, and a second set of configuration data of the respective sets of configuration data, and wherein the controlling further comprises:

the detecting, in the context field of the configuration block, the change comprises detecting that the first context value is changed to the second context value, and wherein the reconfiguring the at least one of the at least one of the respective resources comprises reconfiguring the resource from having the first configuration parameters associated with the first context value to have the second configuration parameters based at least in part on the portion of the second set of configuration data associated with the second context value and stored in the resource.

3. The method of claim 1, wherein the context value is a hybrid context value that comprises a first context value in a first portion of the context field and a second context value in a second portion of the context field, wherein the context is a first context, wherein the application is a first application, wherein the first context value indicates the first context and the first application, and wherein the second context value indicates a second context of the respective contexts and a second application of the respective applications that is associated with the second context.

4. The method of claim 3, wherein the respective sets of configuration data comprises the second set of configuration data, wherein the respective resources comprise a first resource and a second resource, and wherein the controlling of the configuration of and the access to the respective resources comprises:

controlling configuration of and access to the first resource based at least in part on the first set of configuration data associated with the first context relating to the first application and based at least in part on the first context value; and controlling configuration of and access to the second resource based at least in part on the second set of configuration data associated with the second context relating to the second application and based at least in part on the second context value.

5. The method of claim 4, wherein the controlling of the configuration of and the access to the first resource and the controlling of the configuration of and the access to the second resource are performed in parallel.

6. The method of claim 1, wherein the context value is a first context value, wherein the context is a first context, wherein the application is a first application, and wherein the method further comprises:

to facilitate transitioning from the first context to a second context, transmitting, by the system, a notification message to a direct memory access engine to notify the direct memory access engine that the first context is to be changed to the second context associated with a second application of the respective applications and operations associated with the first application are to be suspended.

7. The method of claim 1, further comprising:

pre-loading, by the system, the respective sets of configuration data into the respective resources to facilitate the storing of the respective sets of configuration data in respective data stores associated with the respective resources.

8. The method of claim 1, wherein the application is a first application, wherein the context is a first context, wherein the context value is a first context value, wherein respective first groups of one or more configuration data of the respective sets of configuration data are associated with the respective resources and the first application, wherein the controlling of the configuration of and the access to the respective resources comprises, during a first time period, controlling configuration of and access to the respective resources based at least in part on the respective first groups of one or more configuration data, in accordance with the first context value.

9. The method of claim 8, wherein the respective applications comprise a second application, wherein the respective contexts comprise a second context associated with the second application, a second context value, and respective second groups of configuration data of the respective sets of configuration data, wherein the respective second groups of configuration data relate to the second application, and wherein the method further comprises:

performing, by the system, a single write operation to write the second context value to the context field to facilitate transitioning the respective resources from the first context to the second context in connection with a second time period, wherein the controlling of the configuration of and the access to the respective resources comprises: in response to the second context value being in the context field, during the second time period, controlling configuration of and access to the respective resources based at least in part on the respective second plurality of configuration data, in accordance with the second context value.

10. The method of claim 8, wherein the respective resources comprise a function block, wherein, during the first time period, the function block is configured to have the first configuration parameters based at least in part on first function-block configuration data of the first set of configuration data of the respective first plurality of configuration data in connection with the first context associated with the first application, wherein the first function-block configuration data is stored in the function block, and wherein the method further comprises:

selecting, by the system, the second context associated with the second application;

suspending, by the system, an operation associated with a direct memory access engine and the function block, in accordance with a defined procedure associated with the function block;

storing, by the system, operation data associated with the operation in a data store to facilitate resuming, at a future time, the operation based on a point in the operation where the operation was suspended;

in response to the suspending of the operation, updating, by the system, the context field of the configuration block of the system-on-chip device from the first context value associated with the first context and the first application to the second context value, wherein the second context value is associated with the second context, the second application, and the second set of configuration data comprising second function-block configuration data, and wherein the respective sets of configuration data comprise the second set of configuration data; and in response to detecting the second context value in the context field, reconfiguring, by the system, the function block to have second configuration parameters based at least in part on the second function-block configuration data associated with the second context value, wherein the second function-block configuration data is stored in the function block.

11. The method of claim 8, wherein the respective resources comprise a direct memory access engine, wherein, during the first time period, the direct memory access engine is configured to have the first configuration parameters based at least in part on first direct-memory-access-engine configuration data of the first set of configuration data in connection with the first context associated with the first application, wherein the first direct-memory-access-engine configuration data is stored in the direct memory access engine, wherein the respective applications comprise a second application, wherein the respective contexts comprise a second context associated with the second application, a second context value, and the second set of configuration data of the respective sets of configuration data, wherein the second set of configuration data relates to the second application and comprises second direct-memory-access-engine configuration data, and wherein the method further comprises:

in response to detecting the second context value in the context field, during the second time period, reconfiguring, by the system, the direct memory access engine to have the second configuration parameters based at least in part on the second direct-memory-access-engine configuration data associated with the second context value and stored in the direct memory access engine.

12. A system, comprising:
a set of resources that perform respective functions, wherein respective sets of configuration parameter data are stored in respective resources of the set of resources, wherein the respective sets of configuration parameter data are associated with respective applications related to respective contexts;
a memory that stores computer-executable components; and
a processor that executes computer-executable components stored in the memory, wherein the computer executable-components comprise:
a resource management component that facilitates controlling configuration of and access to the respective resources based at least in part on the respective sets of configuration parameter data and a context value in a context field of a context select component, wherein the context value indicates a context of the respective contexts and an application of the respective applications that is related to the context; and
in response to detecting, in the context field, a change of the context value, at least one of the respective resources being configured to reconfigure the at least one of the respective resources from having first configuration parameters based at least in part on a portion of a first set of configuration parameter data, of the respective sets of configuration parameter data, to have second configuration parameters based at least in part on a portion of a second set of configuration parameter data that is stored in the at least one of the respective resources and associated with the changed context value.

13. The system of claim 12, wherein the context value is a complex context value that comprises a first context value in a first portion of the context field and a second context value in a second portion of the context field, wherein the context is a first context, wherein the application is a first application, wherein the first context value indicates the first context and the first application, and wherein the second context value indicates a second context of the respective contexts and a second application of the respective applications that is related to the second context.

14. The system of claim 13, wherein the respective sets of configuration parameter data comprises the second set of configuration parameter data, wherein the respective resources comprise a first resource and a second resource,
wherein the first resource controls configuration of and access to the first resource based at least in part on the first set of configuration parameter data associated with the first context relating to the first application and based at least in part on the first context value, and
wherein the second resource controls configuration of and access to the second resource based at least in part on the second set of configuration parameter data associated with the second context relating to the second application and based at least in part on the second context value.

15. The system of claim 12, wherein the context value is a first context value, wherein the context is a first context associated with the first context value, wherein the application is a first application associated with the first context and the first context value, and wherein the resource management component communicates the first context value to the context select component to facilitate transitioning the respective resources to the first context during a first time period.

16. A system, comprising:
a set of resources that perform respective functions, wherein respective sets of configuration parameter data are stored in respective resources of the set of resources, wherein the respective sets of configuration parameter data are associated with respective applications related to respective contexts;
a memory that stores computer-executable components; and
a processor that executes computer-executable components stored in the memory, wherein the computer executable-components comprise:
a resource management component that facilitates controlling configuration of and access to the respective resources based at least in part on the respective sets of configuration parameter data and a context value in a context field of a context select component, wherein the context value indicates a context of the respective contexts and an application of the respective applications that is related to the context;
wherein the context value is a first context value, wherein the context is a first context associated with the first context value, wherein the application is a first application associated with the first context and the first context value, and wherein the resource management component communicates the first context value to the context select component to facilitate transitioning the respective resources to the first context during a first time period; and
wherein the respective sets of configuration parameter data comprise respective first sets of configuration parameter data associated with the first application, the first context, and the first context value, wherein the respective resources detect the first context value in the context field of the context select component and determine respective configuration parameter data of the respective first sets of configuration parameter data based at least in part on the first context value, and wherein the respective configuration parameter data are associated with and stored in the respective resources.

17. The system of claim 16, wherein the respective resources comprise at least one of a first function block, a second function block, or a direct memory access engine, wherein the resource is one of the first function block, the second function block, or the direct memory access engine, and wherein, during the first time period, at least one of:
- the first function block or a first block protection unit are configured based at least in part on first configuration parameter data of the respective configuration parameter data, wherein the first block protection unit is associated with the first function block, and wherein the first configuration parameter data relates to the first function block and the first application with respect to the first context value;
- the second function block or a second block protection unit are configured based at least in part on second configuration parameter data of the respective configuration parameter data, wherein the second block protection unit is associated with the second function block, and wherein the second configuration parameter data relates to the second function block and the first application with respect to the first context value; or
- the direct memory access engine is configured based at least in part on third configuration parameter data of the respective configuration parameter data, wherein the third configuration parameter data relates to the direct memory access engine and the first application with respect to the first context value.

18. The system of claim 16, wherein the respective resources control access to and use of the respective resources by the first application based at least in part on respective configurations of the respective resources, and wherein the respective configurations of the respective resources are performed based at least in part on the respective configuration parameter data associated with the respective resources.

19. A non-transitory machine-readable medium, comprising executable instructions that, when executed by a processor, facilitate performance of operations, comprising:
- storing respective items of configuration parameter information in respective resources of a system-on-chip device, wherein the respective items of configuration parameter information are associated with respective applications and the respective resources, and wherein the respective applications are associated with respective contexts;
- managing configuration of and access to the respective resources based at least in part on the respective items of configuration parameter information associated with the respective contexts and based at least in part on a context value in a context field of a configuration block, wherein the context value indicates a context of the respective contexts and an application of the respective applications that is associated with the context; and
- in response to detecting, in the context field of the configuration block, a change of the context value, reconfiguring the at least one of the respective resources from having first configuration parameters based at least in part on a portion of a first set of configuration data, of the respective sets of configuration data, to have second configuration parameters based at least in part on a portion of a second set of configuration data that is stored in the at least one of the respective resources and associated with the changed context value.

20. The non-transitory machine-readable medium of claim 19, wherein the respective resources comprise at least one of a function block, a block protection unit associated with the function block, or a direct memory access engine.

* * * * *